(12) United States Patent
Kondo

(10) Patent No.: US 8,463,076 B2
(45) Date of Patent: Jun. 11, 2013

(54) IMAGE PROCESSING APPARATUS FOR FORMING REDUCED IMAGE

(75) Inventor: Tomonori Kondo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 937 days.

(21) Appl. No.: 12/314,106

(22) Filed: Dec. 4, 2008

(65) Prior Publication Data

US 2009/0154837 A1 Jun. 18, 2009

(30) Foreign Application Priority Data

Dec. 17, 2007 (JP) ................................ 2007-324914

(51) Int. Cl.
*G06K 9/32* (2006.01)

(52) U.S. Cl.
USPC ............................ 382/299; 382/260; 382/274

(58) Field of Classification Search
USPC .............. 340/576; 345/418; 348/231.99, 254; 358/1.9, 1.13, 520; 382/132, 199, 298, 232
See application file for complete search history.

(56) References Cited

U.S. PATENT DOCUMENTS

| | | | | |
|---|---|---|---|---|
| 6,608,941 | B1 * | 8/2003 | Suzuki et al. ................. | 382/272 |
| 7,421,104 | B2 * | 9/2008 | Hsieh et al. ................... | 382/132 |
| 7,508,988 | B2 * | 3/2009 | Hara et al. .................... | 382/232 |
| 7,548,327 | B2 * | 6/2009 | Kondo .......................... | 358/1.13 |
| 7,733,523 | B2 * | 6/2010 | Matsushiro et al. ........... | 358/1.9 |
| 7,839,292 | B2 * | 11/2010 | Wang et al. .................... | 340/576 |
| 7,885,484 | B2 * | 2/2011 | Hasegawa et al. ............. | 382/298 |
| 2007/0195385 | A1 * | 8/2007 | Matsuzaka ..................... | 358/520 |
| 2008/0056615 | A1 * | 3/2008 | Kuno ............................ | 382/298 |
| 2008/0100612 | A1 * | 5/2008 | Dastmalchi et al. ........... | 345/418 |
| 2008/0136939 | A1 * | 6/2008 | Tamamura ............... | 348/231.99 |
| 2009/0091643 | A1 * | 4/2009 | Aragaki ......................... | 348/254 |
| 2009/0232401 | A1 * | 9/2009 | Yamashita et al. ............. | 382/199 |

FOREIGN PATENT DOCUMENTS

JP 2005-094564 4/2005

OTHER PUBLICATIONS

Kita, H., et al., "Image processing apparatus and method for image processing," machine translation of Japanese application 2005-094564, published Apr. 2005.*

* cited by examiner

*Primary Examiner* — Vu Le
*Assistant Examiner* — Xuemei Chen
(74) *Attorney, Agent, or Firm* — Kubotera & Associates, LLC.

(57) ABSTRACT

An image processing apparatus for processing and outputting image data includes a image processing content storage unit for storing contents of an image processing; a thumbnail magnification ratio determining unit for determining a magnification ratio of a thumbnail image according to the contents of the image processing thus stored; a thumbnail image creation unit for creating the thumbnail image from the image data according to the magnification ratio; and an image processing unit for applying the image processing to the thumbnail image thus created according to the contents of the image processing.

5 Claims, 28 Drawing Sheets

IMAGE PROCESSING APPARATUS FOR FORMING REDUCED IMAGE

CROSS-REFERENCE TO RELATED APPLICATIONS

The disclosure of Japanese Patent Application No. 2007-324914, filed on Dec. 17, 2007, is incorporated in the application by the reference.

BACKGROUND OF THE INVENTION AND RELATED ART STATEMENT

The present invention relates to an image processing apparatus for processing and outputting image data.

A conventional image processing apparatus includes a digital multi-function product having a scanner function and a printing function. In the digital multi-function product, an image processing such as density, hue, sharpness, and the likes is applied to image data read from an original, and the image data are stored in a storage device.

In the conventional image processing apparatus, a thumbnail image reduced to a specific size from that of the image data thus stored may be created. Then, the image processing is applied to the thumbnail image according to a setting of the image processing selected by a user, and the thumbnail image thus processed is displayed. Accordingly, it is possible to collectively confirm an effect of the image processing at various settings (refer to Patent Reference).

Patent Reference: Japanese Patent Publication No. 2005-094564

In the conventional image processing apparatus described above, the thumbnail image may be processed with a spatial filtering image processing affecting the thumbnail image depending on a spatial characteristic of the thumbnail image such as sharpness, noise elimination, moire elimination, and the likes. In the spatial filtering image processing, when the thumbnail image is reduced to an excessively small size, an effect of the spatial filtering image processing may be different from that applied to the thumbnail image in an original size. Accordingly, it is difficult to confirm an effect of the image processing on the thumbnail image.

In view of the problems described above, an object of the present invention is to provide an image processing apparatus capable of solving the problems of the conventional image processing apparatus.

Further objects and advantages of the invention will be apparent from the following description of the invention.

SUMMARY OF THE INVENTION

In order to attain the objects described above, according to the present invention, an image processing apparatus for processing and outputting image data comprises a image processing content storage unit for storing contents of an image processing; a thumbnail magnification ratio determining unit for determining a magnification ratio of a thumbnail image according to the contents of the image processing thus stored; a thumbnail image creation unit for creating the thumbnail image from the image data according to the magnification ratio; and an image processing unit for applying the image processing to the thumbnail image thus created according to the contents of the image processing.

In the present invention, as described above, the image processing apparatus comprises the image processing content storage unit for storing the contents of the image processing; the thumbnail magnification ratio determining unit for determining the magnification ratio of the thumbnail image according to the contents of the image processing thus stored; and the thumbnail image creation unit for creating the thumbnail image from the image data according to the magnification ratio. Then, the image processing unit applies the image processing to the thumbnail image thus created according to the contents of the image processing. Accordingly, it is possible to securely confirm an effect of the image processing on the thumbnail image.

DETAILED DESCRIPTION OF THE PREFERRED EMBODIMENTS

Figure 1:
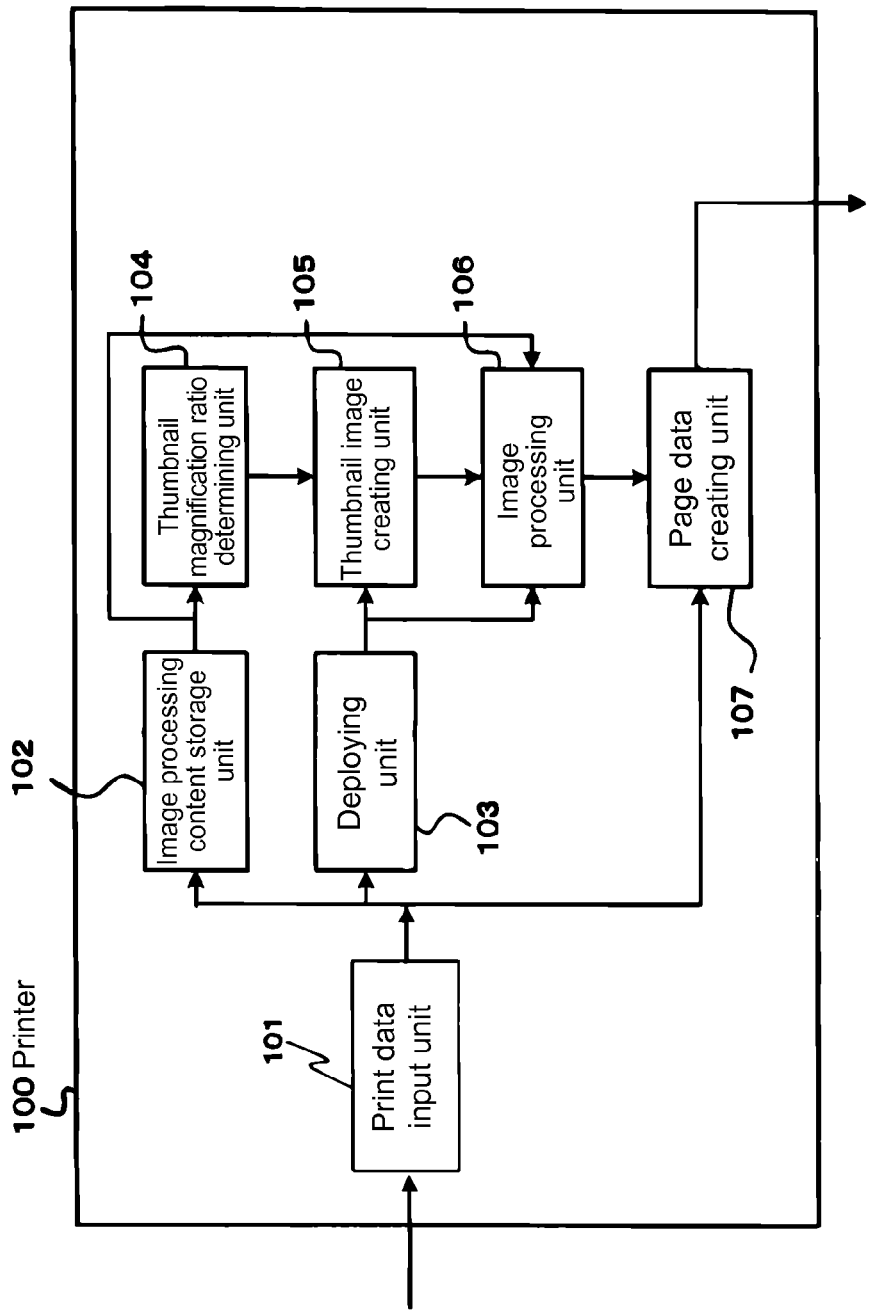
FIG. 1 is a block diagram showing a configuration of an image processing function of a printer according to a first embodiment of the present invention.

Hereunder, embodiments of the present invention will be explained with reference to the accompanying drawings. In the drawings, similar components are designated with the same reference numerals. In the following description, a printer and a multi-function product will be explained as an image processing apparatus, and the present invention may be applicable to a facsimile and a copier.

First Embodiment

Figure 2:
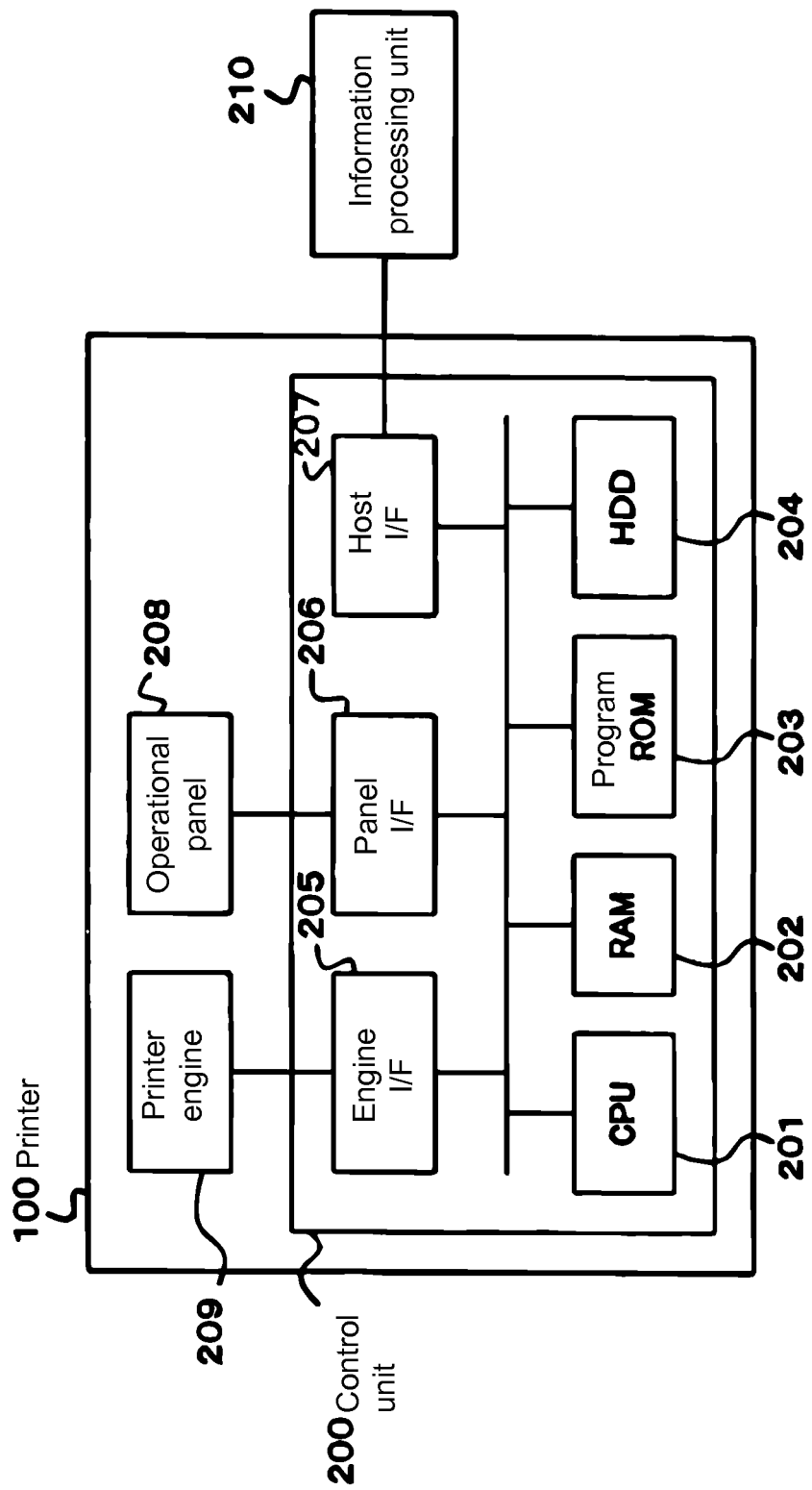
FIG. 2 is a block diagram showing a configuration of the printer according to the first embodiment of the present invention.

A first embodiment of the present invention will be explained. FIG. 2 is a block diagram showing a configuration of a printer 100 according to the first embodiment of the present invention. As shown in FIG. 2, the printer 100 includes a control unit 200 and an information processing unit 210. The control unit 200 converts print data sent from the information processing unit 210 to printable data, and generates page data.

As shown in FIG. 2, the control unit 200 includes a CPU (Central Processing Unit) 201; an RAM (Random Access Memory) 202; a program ROM (Read only Memory) 203; an HDD (Hard Disk Drive) 204; an engine I/F (Interface) 205; a panel I/F (Interface) 206; and a host I/F (Interface) 207.

In the embodiment, the CPU 201 temporarily writes various programs stored in the program ROM 203 into the RAM 202, and executes the various programs to control the printer 100 as a whole. The HDD 204 is formed of a magnetic storage device for storing and holding data even after power is turned off.

As shown in FIG. 2, the control unit 200 is connected through the corresponding I/Fs to an operational panel 208 for displaying a screen for an operator to perform an input operation; a printer engine 209 for printing the page data generated with the control unit 200; and the information processing unit 210.

FIG. 1 is a block diagram showing a configuration of an image processing function of the printer 100 according to the first embodiment of the present invention. The image processing function is stored in the program ROM 203 as a control program, so that the CPU 201 temporarily writes the control program into the RAM 202 and executes the same.

As shown in FIG. 1, the printer 100 includes a print data input unit 101. The print data input unit 101 receives the print data and contents of an image processing (image processing contents, described later) from the information processing unit 210 through the host I/F 207, and stores the print data thus received into the RAM 202.

As shown in FIG. 1, the printer 100 further includes an image processing content storage unit 102; a deploying unit 103; and a page data creation unit 107. The print data input unit 101 sends the print data stored in the RAM 202 to the image processing content storage unit 102, the deploying unit 103, and the page data creation unit 107.

In the embodiment, the printer 100 further includes a thumbnail magnification ratio determining unit 104 and an image processing unit 106. The image processing content storage unit 102 stores the image processing contents as setting information related to the image processing from the print data, and sends the image processing contents thus stored to the thumbnail magnification ratio determining unit 104 and the image processing unit 106.

In the embodiment, the printer 100 further includes a thumbnail image creation unit 105. The deploying unit 103 deploys PDL (Page Description Language) data in the print data thus received to create image data, and sends the image data thus created to the thumbnail image creation unit 105. When an ordinary printing operation is performed without performing a thumbnail printing operation, the deploying unit 103 sends the image data thus deployed to the image processing unit 106.

In the embodiment, the thumbnail magnification ratio determining unit 104 determines a magnification ratio of the image data upon forming a thumbnail image according to the image processing contents stored in the image processing content storage unit 102, and sends the magnification ratio thus determined to the image processing unit 106.

In the embodiment, the thumbnail image creation unit 105 creates thumbnail image data according to the image data deployed with the deploying unit 103 and the magnification ratio determined with the thumbnail magnification ratio determining unit 104, and sends the thumbnail image data thus created to the image processing unit 106.

In the embodiment, the image processing unit 106 applies the image processing to the thumbnail image data created with the thumbnail image creation unit 105 according to the image processing contents stored in the image processing content storage unit 102, and sends the thumbnail image data thus processed to the page data creation unit 107. When an ordinary printing operation is performed without performing the thumbnail printing operation, the image processing unit 106 applies the image processing to the image data deployed with the deploying unit 103 according to the image processing contents stored in the image processing content storage unit 102, and sends the image data thus processed to the page data creation unit 107.

In the embodiment, the page data creation unit 107 creates the page data per one page printable with the printer 100 from the image data processed with the image processing unit 106 according to print setting information of the print data received and stored with the print data input unit 101, and sends the page data to the engine I/F 205.

Figure 3:
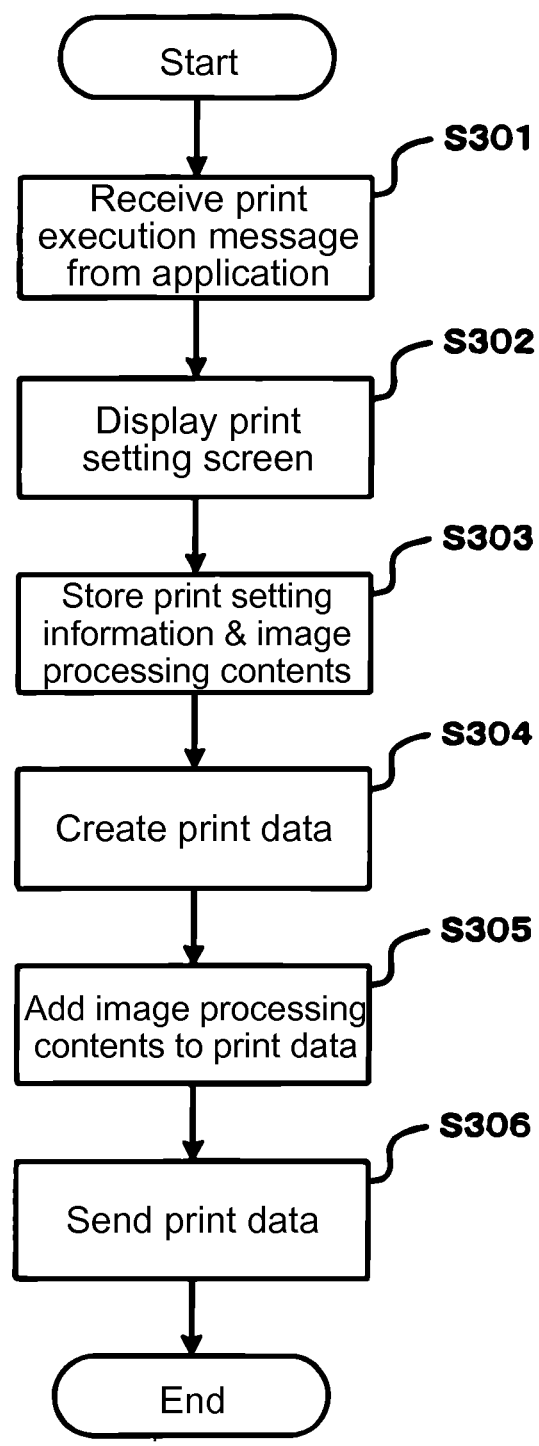
FIG. 3 is a flow chart showing an operation of an information processing unit of the printer according to the first embodiment of the present invention.

An operation of the printer 100 as the image processing apparatus will be explained next with reference to FIGS. 3 to 11. FIG. 3 is a flow chart showing an operation of the information processing unit 210 of the printer 100 according to the first embodiment of the present invention. The operation shown in FIG. 3 is executed at a printer driver (not shown).

Figure 5:
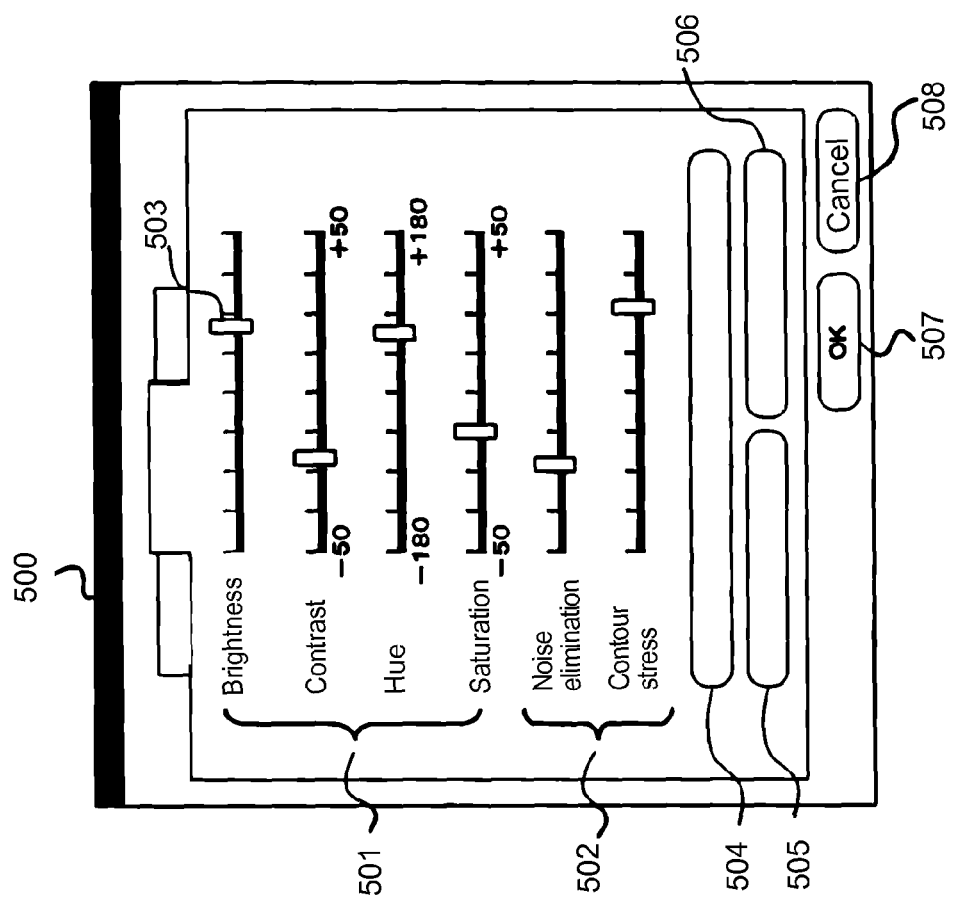
FIG. 5 is a schematic view showing an example of a setting screen No. 1 of the printer according to the first embodiment of the present invention.

In step S301, when a print direction is performed from an application on the information processing unit 210, the printer driver (not shown) on the information processing unit 210 receives a print execution message from the application. In step S302, when the printer driver receives the print execution message, the printer driver displays a print setting screen on a display unit (not shown) on the information processing unit 210. FIG. 5 is a schematic view showing an example of a setting screen No. 1 of the printer 100 according to the first embodiment of the present invention. The setting screen No. 1 or a thumbnail printing direction screen 500 is used for performing the thumbnail printing operation of the printer 100.

As shown in FIG. 5, on the thumbnail printing direction screen 500, it is possible to set the image processing contents. The thumbnail printing direction screen 500 includes non-spatial filtering processing parameters 501 of the image processing not depending on a spatial characteristic of an image and spatial filtering processing parameters 502 of the image processing depending on a spatial characteristic of an image.

In the embodiment, the non-spatial filtering processing parameters 501 include brightness adjustment for adjusting brightness; contrast adjustment for adjusting contrast; hue adjustment for adjusting hue; and color saturation adjustment for adjusting color saturation. The spatial filtering processing parameters 502 include noise elimination for eliminating a noise; and contour stress for stressing a contour. The image processing is performed with a well-known algorism, and an adjustment bar 503 adjusts a degree of an effect stepwise.

In the embodiment, the thumbnail printing direction screen 500 includes a register button 504. When the register button 504 is pushed, the image processing contents currently set are registered through thumbnail registration (described later).

In the embodiment, the thumbnail printing direction screen 500 includes a range register button 505. When the range register button 505 is pushed, a range of the image processing contents is registered through the thumbnail registration (described later).

In the embodiment, the thumbnail printing direction screen 500 includes a confirmation button 506. When the confirmation button 506 is pushed, the image processing contents currently registered through the thumbnail registration are confirmed (described later).

In the embodiment, the thumbnail printing direction screen 500 includes an OK button 507. When the OK button 507 is pushed, the setting operation is completed. Further, the thumbnail printing direction screen 500 includes a cancel button 508. When the cancel button 508 is pushed, the printing operation is canceled.

Figure 6:
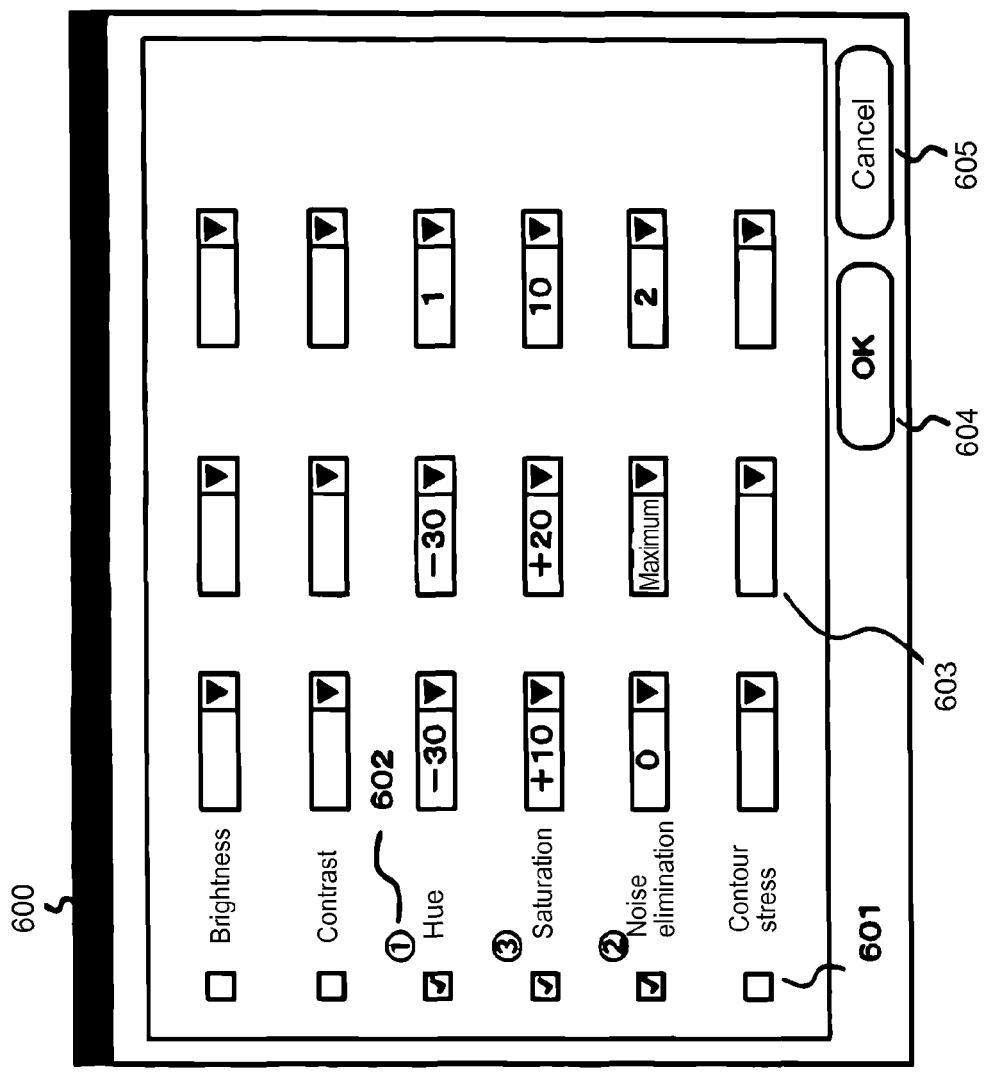
FIG. 6 is a schematic view showing an example of a setting screen No. 2 of the printer according to the first embodiment of the present invention.

FIG. 6 is a schematic view showing an example of the setting screen No. 2 or an image processing content range registration screen 600 of the printer 100 according to the first embodiment of the present invention. When the range register button 505 of the thumbnail printing direction screen 500 is pushed, the image processing content range registration screen 600 is displayed. With the image processing content range registration screen 600, it is possible to collectively register the image processing contents of the thumbnail image without registering each of the image processing contents.

As shown in FIG. 6, the image processing content range registration screen 600 includes check boxes 601 for setting whether the image processing contents shown in FIG. 5 are executed. When the check box 601 is checked, it is possible to set the corresponding image processing to be performed.

In the embodiment, the image processing content range registration screen 600 further includes a priority order 602. The priority order 602 is set and displayed according to an order of checking the check boxes 601. A small number of the priority order 602 represents a higher priority, and the effects with various strengths are changed and combined within the ranges according to the priority order 602.

In the embodiment, the image processing content range registration screen 600 further includes list boxes 603. When one of the check boxes 601 is checked, the list boxes 603 of the corresponding image processing become selectable, thereby making it possible to set an upper limit, a lower limit, and a step level of the strength of the effect of the image processing.

In the example shown in FIG. 6, the hue adjustment is checked first. Then, the upper limit, the lower limit, and the step level thereof are set at −30, −30, and 1, respectively. Then, the noise elimination is checked second, and the upper limit, the lower limit, and the step level thereof are set at 0, maximum, and 2, respectively. Then, the color saturation adjustment is checked last, and the upper limit, the lower limit, and the step level thereof are set at +10,+20, and 10, respectively.

In the embodiment, when an OK button 604 is pushed, the range setting is completed, and the range is registered according to the settings. Then, the image processing content range registration screen 600 is returned to the thumbnail printing direction screen 500. When a cancel button 605 is pushed, the range registration is canceled, and the image processing content range registration screen 600 is returned to the thumbnail printing direction screen 500.

Figure 7:
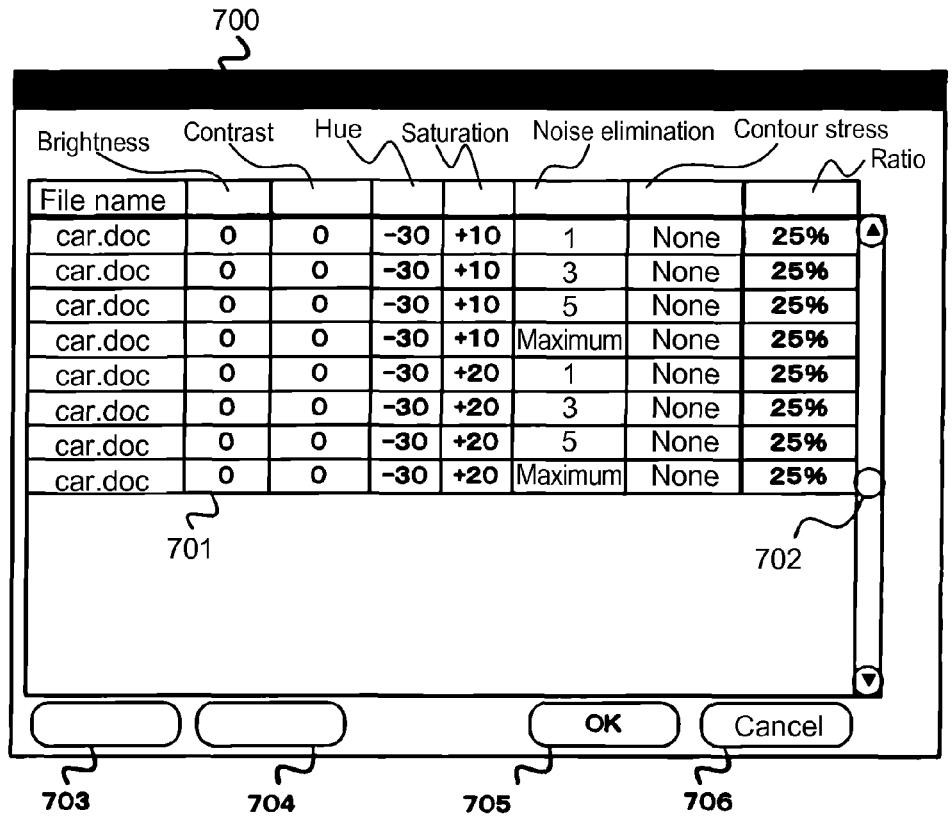
FIG. 7 is a schematic view showing an example of a setting screen No. 3 of the printer according to the first embodiment of the present invention.

FIG. 7 is a schematic view showing an example of a setting screen No. 3 or a thumbnail printing registration confirmation screen 700 of the printer 100 according to the first embodiment of the present invention. With the thumbnail printing registration confirmation screen 700, it is possible to collectively confirm the image processing contents currently registered.

As shown in FIG. 7, the thumbnail printing registration confirmation screen 700 includes image processing contents 701 arranged in a spreadsheet format for confirming the image processing contents currently registered. When an amount of the image processing contents is too large to display, it is possible to display a portion of the image processing contents not displayed by moving a scroll bar 702.

In the embodiment, the thumbnail printing registration confirmation screen 700 includes a delete button 703. When the delete button 703 is pushed, it is possible to delete one of the image processing contents corresponding to one row selected. Further, the thumbnail printing registration confirmation screen 700 includes an all delete button 704. When the all delete button 704 is pushed, it is possible to delete all of the image processing contents thus registered.

The example shown in FIG. 7 is displayed when the range registration shown in FIG. 6 is performed. As shown in FIG. 7, according to the combination priority order, the strengths of the effects of the hue adjustment, the noise elimination, and the color saturation adjustment are adjusted.

In the embodiment, the thumbnail printing registration confirmation screen 700 includes an OK button 705. When the OK button 705 is pushed, the thumbnail printing registration confirmation screen 700 returns to the thumbnail printing direction screen 500 with reflecting the deletion operation.

In step S302, a printing condition (not shown) such as a sheet size, a printing resolution, and a duplex printing mode may be set as well. When all of the settings are completed and the OK button 507 is pushed, the process proceeds to step S303.

In step S303, the printer driver stores the print setting information and the image processing contents set in step S302. When an ordinary printing operation is performed without performing the thumbnail printing operation, the printer driver stores one of the image processing contents. When the thumbnail printing operation is performed, the printer driver stores a plurality of the image processing contents.

In step S304, the printer driver creates the PDL (Page Description Language) data described with PDL printable with the printer 100 from the application data received from the application in step S301. Then, the printer driver adds the print setting information stored in step S303 to create the print data. In step S305, the printer driver adds the image processing contents stored in step S303 to the print data created in step S304.

Figure 8:
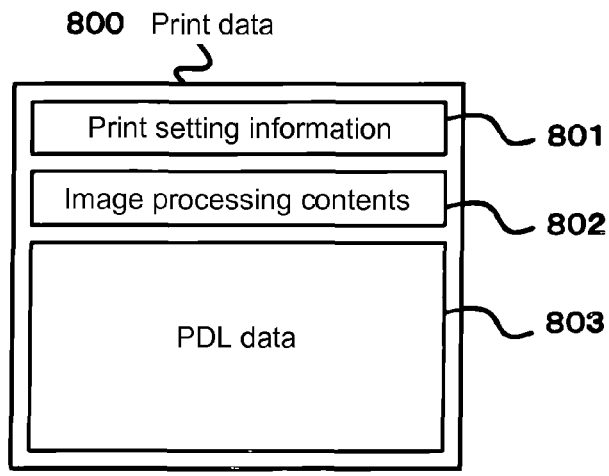
FIG. 8 is a schematic view showing an example of print data of the printer according to the first embodiment of the present invention.

FIG. 8 is a schematic view showing an example of print data 800 of the printer 100 created in step S304 according to the first embodiment of the present invention. As shown in FIG. 8, the print data 800 includes print setting information 801; image processing contents 802; and PDL data 803.

In the embodiment, the print setting information 801 is related to the printing condition such as the sheet size, the printing resolution, and the duplex printing mode. The image processing contents 802 are setting information related to the image processing explained with reference to FIGS. 5 to 7. The PDL data 803 are related to an image described with the PDL (Page Description Language).

In step S306, the printer driver sends the print data created in step S305 to the printer 100.

Figure 4:
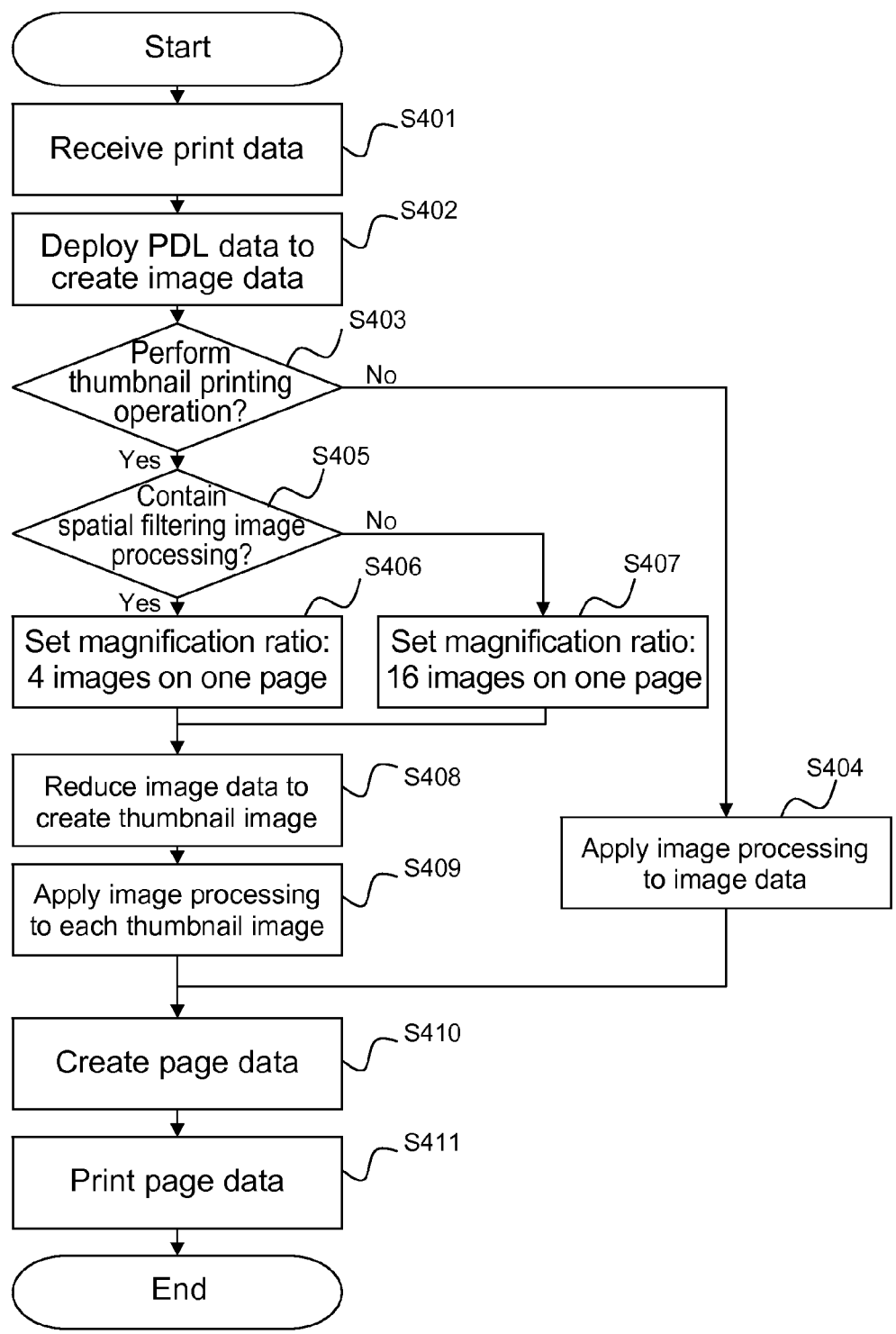
FIG. 4 is a flow chart showing an operation of the printer according to the first embodiment of the present invention.

An operation of the printer 100 will be explained next. FIG. 4 is a flow chart showing the operation of the printer 100 according to the first embodiment of the present invention. The control program is stored in the program ROM 203 of the printer 100, and the CPU 201 temporarily stores the control program in the RAM 202, and executes the control program.

In step S401, the print data input unit 101 receives the print data sent from the information processing unit 210 through the host I/F (Interface) 207, and stores the print data thus received into the RAM 202. The image processing contents in the print data are stored in the RAM 202 of the image processing content storage unit 102.

In step S402, the deploying unit 103 deploys the PDL data in the print data received with the print data input unit 101 to create the image data.

In step S403, it is determined whether the thumbnail printing operation is performed according to a number of the image processing contents stored in the image processing content storage unit 102 in step S401. When a plurality of the image processing contents is stored in the image processing content storage unit 102, it is determined that the thumbnail printing operation is performed, and the process proceeds to step S405. When a plurality of the image processing contents is not stored in the image processing content storage unit 102, it is determined that the ordinary printing operation is performed without performing the thumbnail printing operation, and the process proceeds to step S404.

In step S404, when a plurality of the image processing contents is not stored in the image processing content storage unit 102, and it is determined that the ordinary printing operation is performed in step S403, the image processing unit 106 applies the image processing stored in the image processing content storage unit 102 to the image data deployed with the deploying unit 103.

In step S405, when a plurality of the image processing contents is stored in the image processing content storage unit 102, and it is determined that the thumbnail printing operation is performed in step S403, the thumbnail magnification ratio determining unit 104 determines whether the image processing contents stored in the image processing content storage unit 102 contain the spatial filtering image processing. When the thumbnail magnification ratio determining unit 104 determines that the image processing contents do not contain the spatial filtering image processing, the process proceeds to step S407.

In step S406, when the thumbnail magnification ratio determining unit 104 determines that the image processing contents contain the spatial filtering image processing in step S405, the thumbnail magnification ratio determining unit 104 sets the magnification ratio capable of arranging four images on one page, i.e., 50%.

In step S407, when the thumbnail magnification ratio determining unit 104 determines that the image processing contents do not contain the spatial filtering image processing in step S405, the thumbnail magnification ratio determining unit 104 sets the magnification ratio capable of arranging sixteen images on one page, i.e., 25%.

In step S408, the thumbnail image creation unit 105 reduces the image data deployed with the deploying unit 103 according to the magnification ratio determined with the thumbnail magnification ratio determining unit 104 to create the thumbnail images. The image reduction process may be performed using a well-known algorism such as a nearest neighbor method and a linear interpolation bilinear method.

In step S409, the image processing unit 106 applies the image processing stored in the image processing content storage unit 102 to each of the thumbnail images created with the thumbnail image creation unit 105.

In step S410, the page data creation unit 107 creates the page data per one page according to the image data processed with the image processing unit 106 and the print setting information in the print data received with the print data input unit 101.

In step S411, the engine I/F 205 prints the page data created with the page data creation unit 107, and outputs the print result, thereby completing the printing operation.

Figure 9:
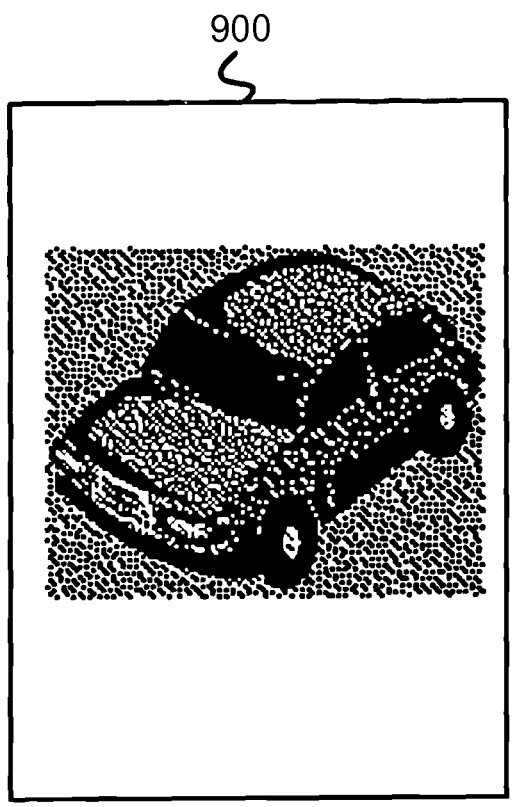
FIG. 9 is a schematic view showing an example No. 1 of a print result of the printer according to the first embodiment of the present invention.
Figure 10:
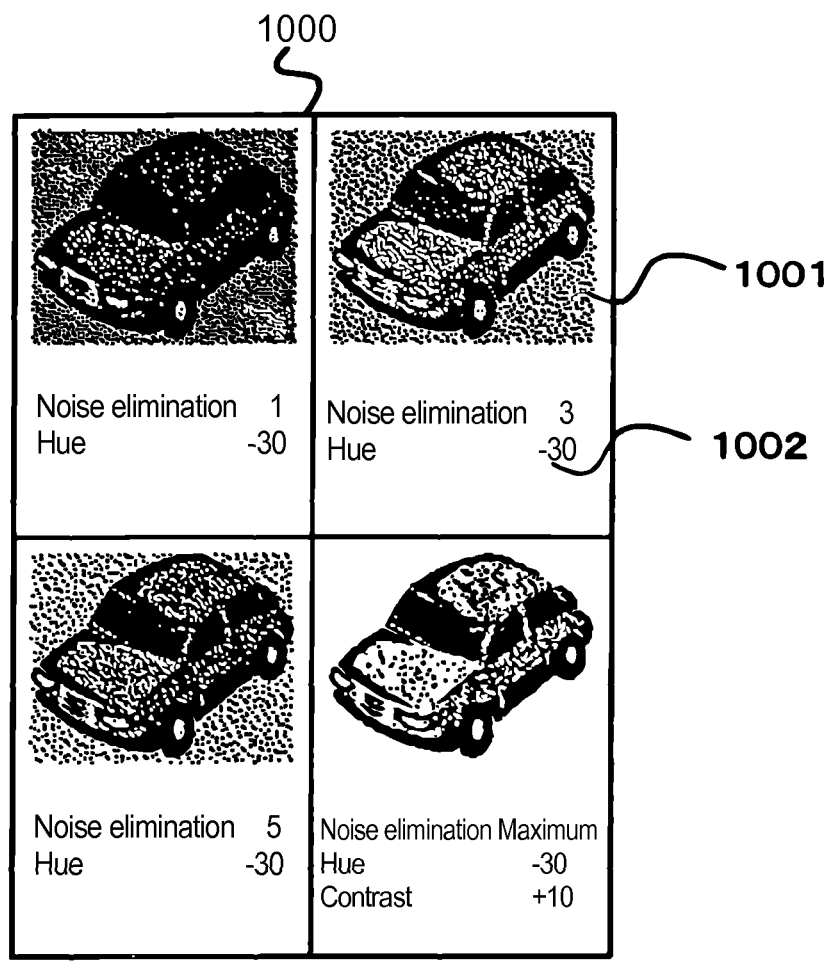
FIG. 10 is a schematic view showing an example No. 2 of the print result of the printer according to the first embodiment of the present invention.
Figure 11:
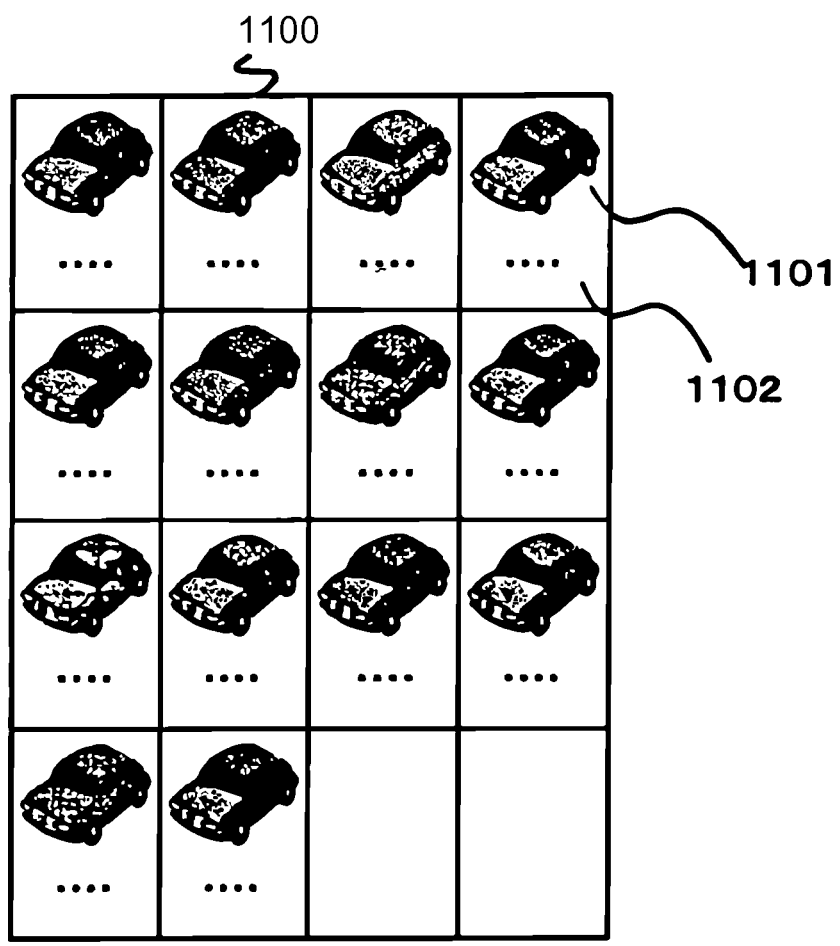
FIG. 11 is a schematic view showing an example No. 3 of the print result of the printer according to the first embodiment of the present invention.

FIG. 9 is a schematic view showing an example No. 1 (a print result 900 in the ordinary printing operation) of a print result of the printer 100 according to the first embodiment of the present invention. FIG. 10 is a schematic view showing an example No. 2 (a print result 1000 with the spatial filtering processing) of the print result of the printer 100 according to the first embodiment of the present invention. FIG. 11 is a schematic view showing an example No. 3 (a print result 1100 without the spatial filtering processing) of the print result of the printer 100 according to the first embodiment of the present invention.

As shown in FIG. 10, in the print result 1000 with the spatial filtering processing, four images are arranged in one page. More specifically, thumbnail images 1001 thus processed and corresponding image processing contents 1002 are printed.

As shown in FIG. 11, in the print result 1100 without the spatial filtering processing, sixteen images are arranged in one page. More specifically, thumbnail images 1101 thus processed and corresponding image processing contents 1102 are printed.

As described above, in the embodiment, the printer 100 is provided with the thumbnail magnification ratio determining unit 104 for determining the magnification ratio of the thumbnail image of the image data. When the spatial filtering processing is applied, the magnification ratio is increased, so that the thumbnail image is printed in a large size. Accordingly, when the spatial filtering processing is applied to the thumbnail image, it is possible to reduce the influence on the spatial characteristic of the thumbnail image, thereby making it possible to securely confirm the effect of the image processing on the thumbnail image.

Second Embodiment

A second embodiment of the present invention will be explained. Components in the second embodiment similar to those in the first embodiment are designated by the same reference numerals, and explanations thereof are omitted. The components and operations in the second embodiment similar to those in the first embodiment provide effects same as those in the first embodiment, and explanations thereof are omitted.

Figure 12:
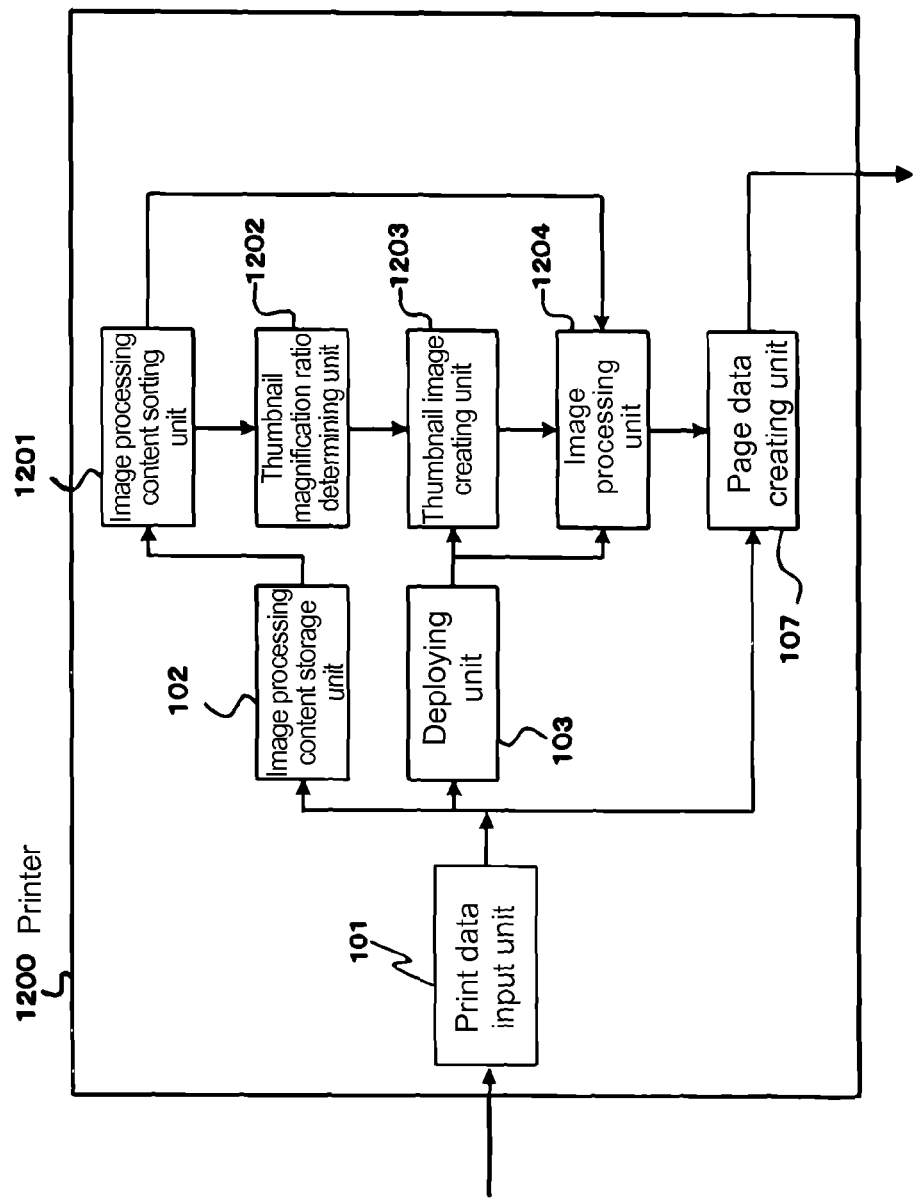
FIG. 12 is a block diagram showing a configuration of an image processing function of a printer according to a second embodiment of the present invention.

FIG. 12 is a block diagram showing a configuration of an image processing function of a printer 1200 as an image processing apparatus according to the second embodiment of the present invention. The image processing function is stored in the program ROM 203 as a control program, so that the CPU 201 temporarily writes the control program into the RAM 202 and executes the same.

As shown in FIG. 12, the printer 1200 includes an image processing content sorting unit 1201; a thumbnail magnification ratio determining unit 1202; and an image processing unit 1204. The image processing content sorting unit 1201 sorts an order of the image processing contents stored in the image processing content storage unit 102, and sends the image processing contents thus sorted to the thumbnail magnification ratio determining unit 1202 and the image processing unit 1204.

In the embodiment, the printer 1200 further includes a thumbnail image creation unit 1203. The thumbnail magnification ratio determining unit 1202 determines the magnification ratio of the image data upon creating the thumbnail image according to the image processing contents sorted with the image processing content sorting unit 1201, and sends the magnification ratio thus determined to the thumbnail image creation unit 1203.

In the embodiment, the thumbnail image creation unit 1203 creates the thumbnail image data according to the image data deployed with the deploying unit 103 and the magnification ratio determined with the thumbnail magnification ratio determining unit 1202, and sends the thumbnail image data thus created to the image processing unit 1204.

In the embodiment, the printer 1200 further includes a thumbnail image creation unit 1203. The thumbnail reduction ratio determining unit 1202 determines the reduction ratio of the image data upon creating the thumbnail image according to the image processing contents sorted with the image processing content sorting unit 1201, and sends the reduction ratio thus determined to the thumbnail image creation unit 1203.

In the embodiment, the thumbnail image creation unit 1203 creates the thumbnail image data according to the image data deployed with the deploying unit 103 and the reduction ratio determined with the thumbnail reduction ratio determining unit 1202, and sends the thumbnail image data thus created to the image processing unit 1204.

In the embodiment, the image processing unit 1204 applies the image processing to the thumbnail image data created with the thumbnail image creation unit 1203 according to the image processing contents sorted with the image processing content sorting unit 1201, and sends the thumbnail image data thus processed to the page data creation unit 107.

An operation of the printer 1200 will be explained next with reference to FIGS. 13 to 17. A print direction operation performed on the information processing unit 210 is similar to that in the first embodiment shown in FIG. 3, and an explanation thereof is omitted.

Figure 13:
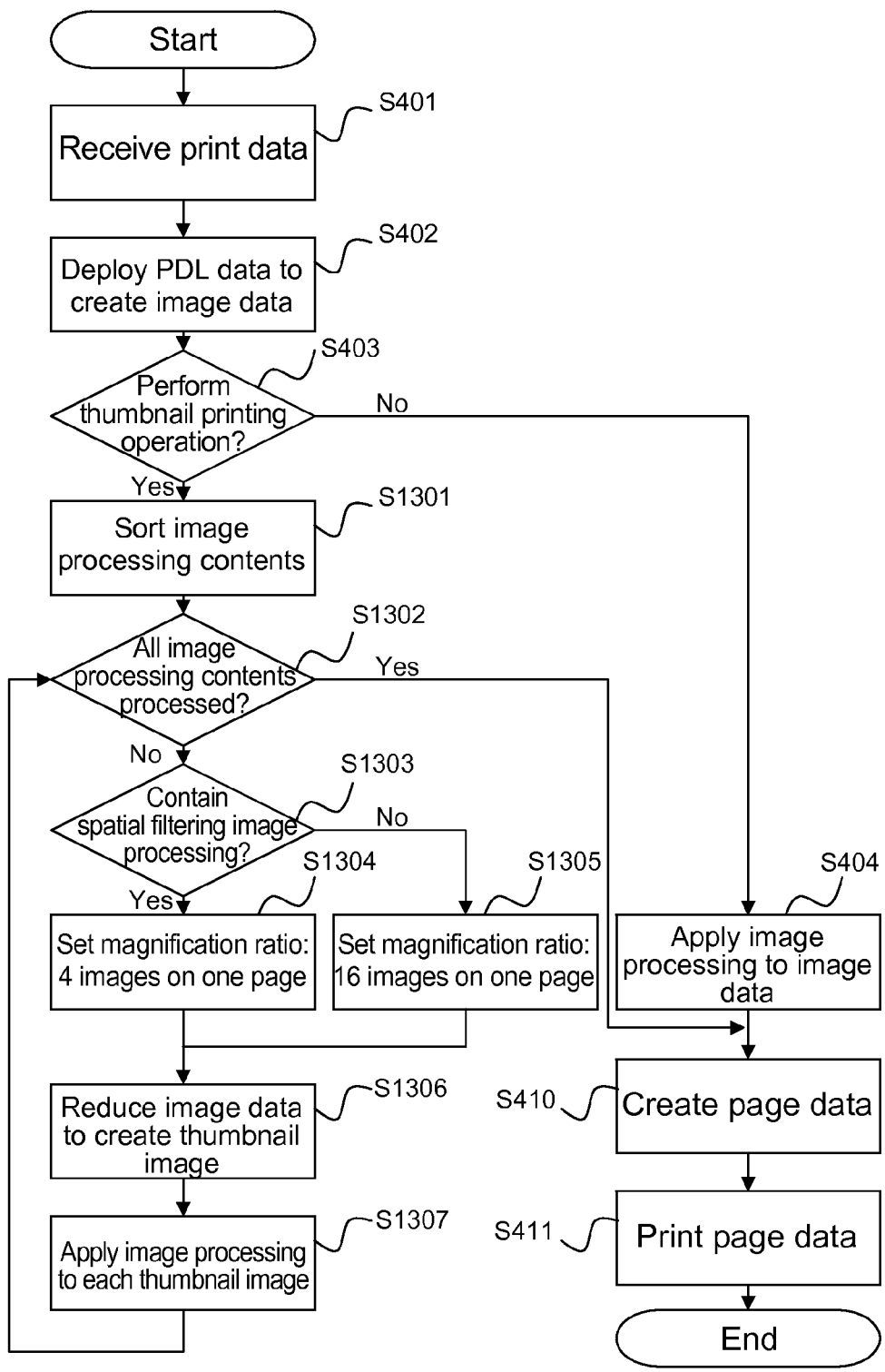
FIG. 13 is a flow chart showing an operation of the printer according to the second embodiment of the present invention.

FIG. 13 is a flow chart showing the operation of the printer 1200 according to the second embodiment of the present invention. The operation of the printer 1200 is stored in the program ROM 203 of the printer 1200 as the control program, and the CPU 201 temporarily writes the control program into the RAM 202 and executes the same upon performing the operation. Steps for performing processes similar to those of the printer 100 in the first embodiment shown in FIG. 4 are designated with the same numbers, and explanations thereof are omitted.

In step S1301, the image processing content sorting unit 1201 sorts the image processing contents stored in the image processing content storage unit 102. More specifically, the image processing content sorting unit 1201 moves the image processing contents with the spatial filtering processing forward while maintaining an original order thereof as possible.

Figure 14:
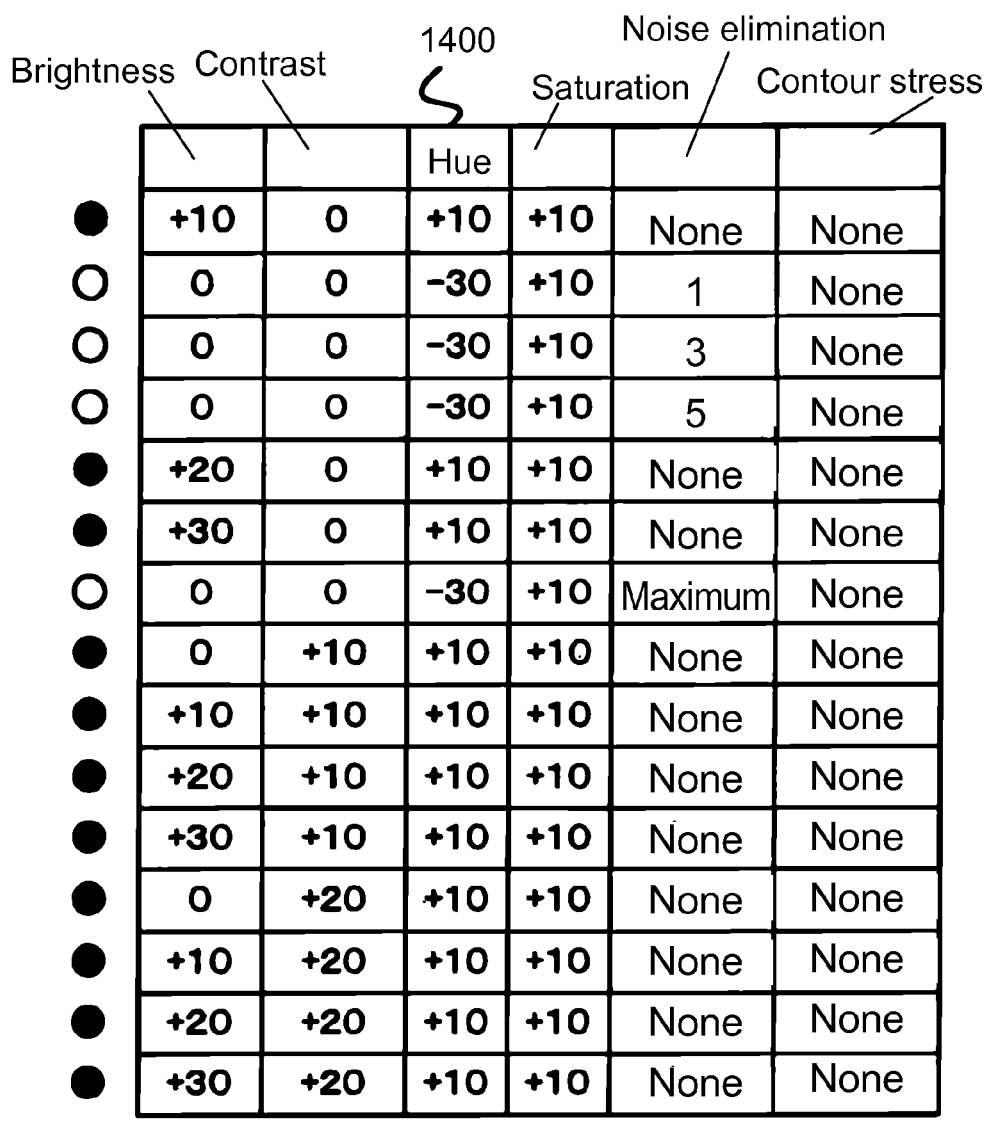
FIG. 14 is a schematic view showing an example No. 1 of image processing contents of the printer according to the second embodiment of the present invention.
Figure 15:
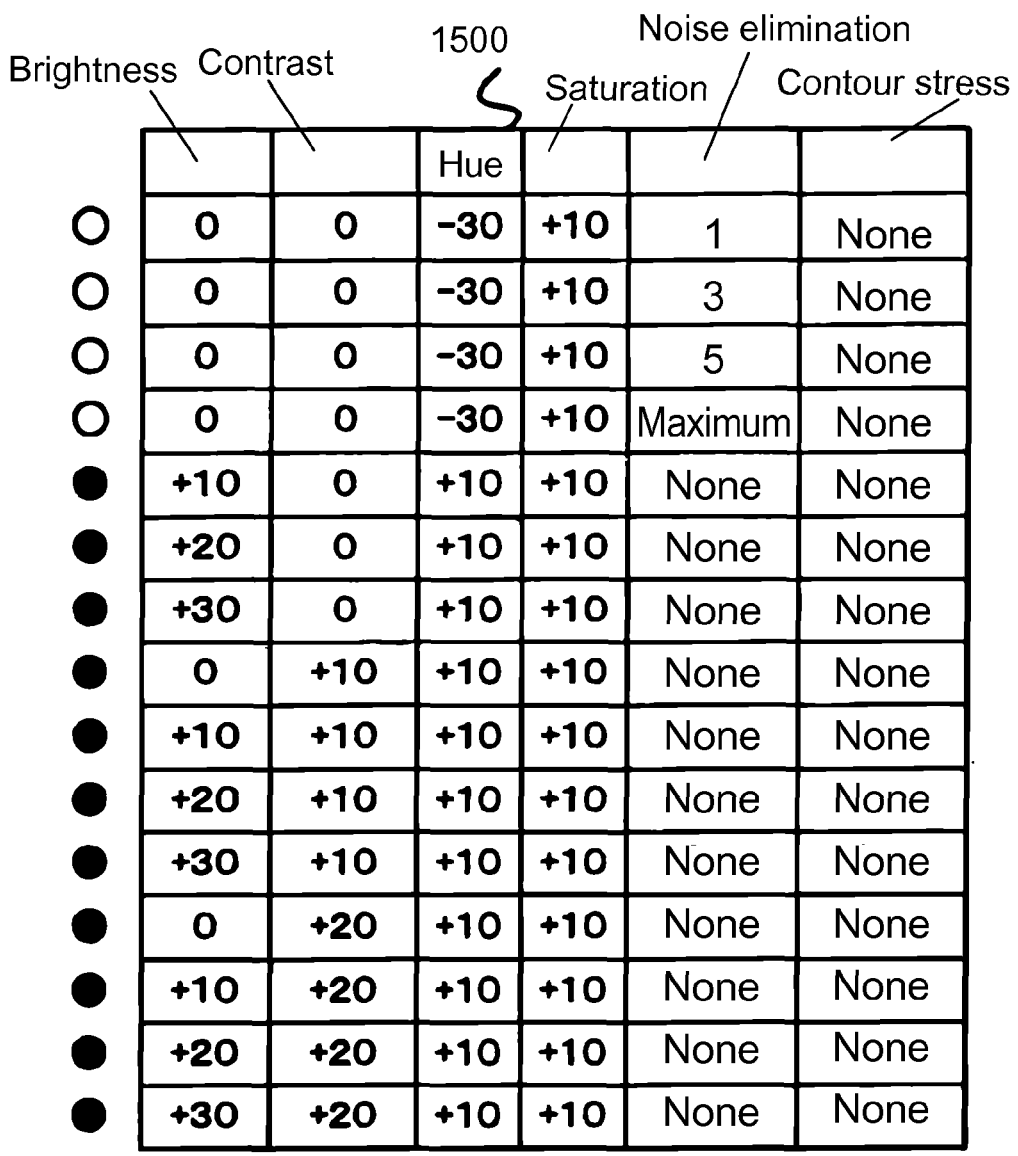
FIG. 15 is a schematic view showing an example No. 2 of the image processing contents of the printer according to the second embodiment of the present invention.

FIG. 14 is a schematic view showing an example No. 1 of image processing contents 1400 of the printer 1200 before sorting according to the second embodiment of the present invention. FIG. 15 is a schematic view showing an example No. 2 of image processing contents 1500 of the printer 1200 after sorting according to the second embodiment of the present invention.

In the examples No. 1 and No. 2, as the spatial filtering processing, the noise elimination is performed at levels of 1, 3, 5, and maximum. The image processing contents including the spatial filtering processing are represented with an empty circle, and the image processing contents without the spatial filtering processing are represented with an filled circle.

In step S1302, the thumbnail magnification ratio determining unit 1202 determines whether all of the image processing contents sorted with the image processing content sorting unit 1201 is completely processed. When all of the image processing contents is not completely processed, the process proceeds to step S1303. When all of the image processing contents is completely processed, the process proceeds to step S410.

In step S1303, the thumbnail magnification ratio determining unit 1202 determines whether the image processing contents contain the spatial filtering processing among the image processing contents sorted with the image processing content sorting unit 1201.

When the image processing contents contain the spatial filtering processing, the thumbnail magnification ratio determining unit 1202 adds processed information to the image processing contents with the spatial filtering processing, and the process proceeds to step S1304. When the image processing contents do not contain the spatial filtering processing, the thumbnail magnification ratio determining unit 1202 adds processed information to the image processing contents without the spatial filtering processing, and the process proceeds to step S1305.

In step S1304, when the image processing contents contain the spatial filtering processing, the thumbnail magnification ratio determining unit 1202 sets the magnification ratio to 50%, so that four images are arranged on one page.

In step S1305, when the image processing contents do not contain the spatial filtering processing, the thumbnail magnification ratio determining unit 1202 sets the magnification ratio to 25%, so that sixteen images are arranged on one page.

In step S1306, the thumbnail image creation unit 1203 reduces the image data deployed with the deploying unit 103 according to the magnification ratio determined with the thumbnail magnification ratio determining unit 1202 to create the thumbnail images. The number of the thumbnail images corresponds to the number of the image processing contents with the processed information added thereto in step S1302. In step S1306, a new page is created as well.

In step S1307, the image processing unit 1204 applies the image processing contents with the processed information added thereto in step S1302 to each of the thumbnail images created with the thumbnail image creation unit 1203.

Figure 16:
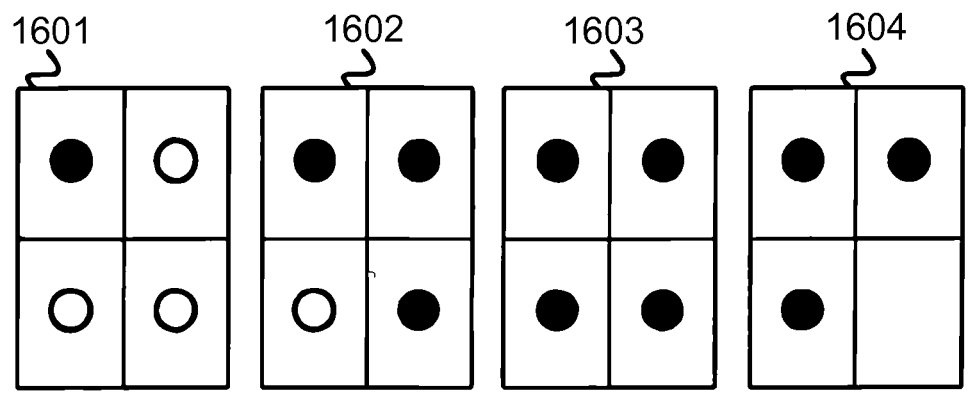
FIG. 16 is a schematic view showing an example No. 1 of page data of the printer according to the second embodiment of the present invention.
Figure 17:
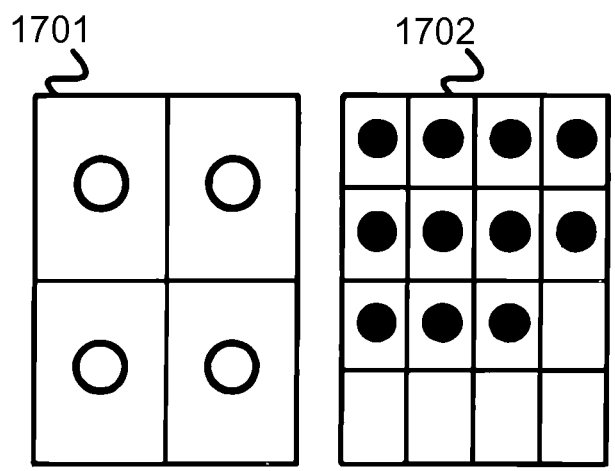
FIG. 17 is a schematic view showing an example No. 2 of the page data of the printer according to the second embodiment of the present invention.

FIG. 16 is a schematic view showing an example No. 1 of page data of the printer 1200 according to the second embodiment of the present invention. FIG. 17 is a schematic view showing an example No. 2 of the page data of the printer 1200 according to the second embodiment of the present invention.

As described above, the image processing contents including the spatial filtering processing are represented with the empty circle, and the image processing contents without the spatial filtering processing are represented with the filled circle.

As shown in FIG. 14, when the image processing contents are not sorted, the empty circles and the filled circles are arranged randomly from the top. When the print data are printed, as shown in FIG. 16, a first page 1601 includes three empty circles and one filled circle; a second page 1602 includes one empty circle and three filled circles; a third page 1603 includes four filled circles; and a fourth page 1604 includes three filled circles.

On the other hand, as shown in FIG. 15, when the image processing contents are sorted, the four empty circles are arranged from the top and the eleven filled circles are arranged below the empty circles. Accordingly, when the print data are printed, as shown in FIG. 17, a first page 1701 is reduced at the magnification ratio of 25%, and includes four empty circles. Further, a second page 1702 is reduced at the magnification ratio of 25%, and includes eleven filled circles.

As described above, in the second embodiment, the printer 1200 as the image processing apparatus is provided with the image processing content sorting unit 1201, so that the image process contents are sorted according to the existence of the spatial filtering processing. Accordingly, in addition to the effects in the first embodiment, it is possible to efficiently print and reduce the number of printed sheets.

Third Embodiment

Figure 18:
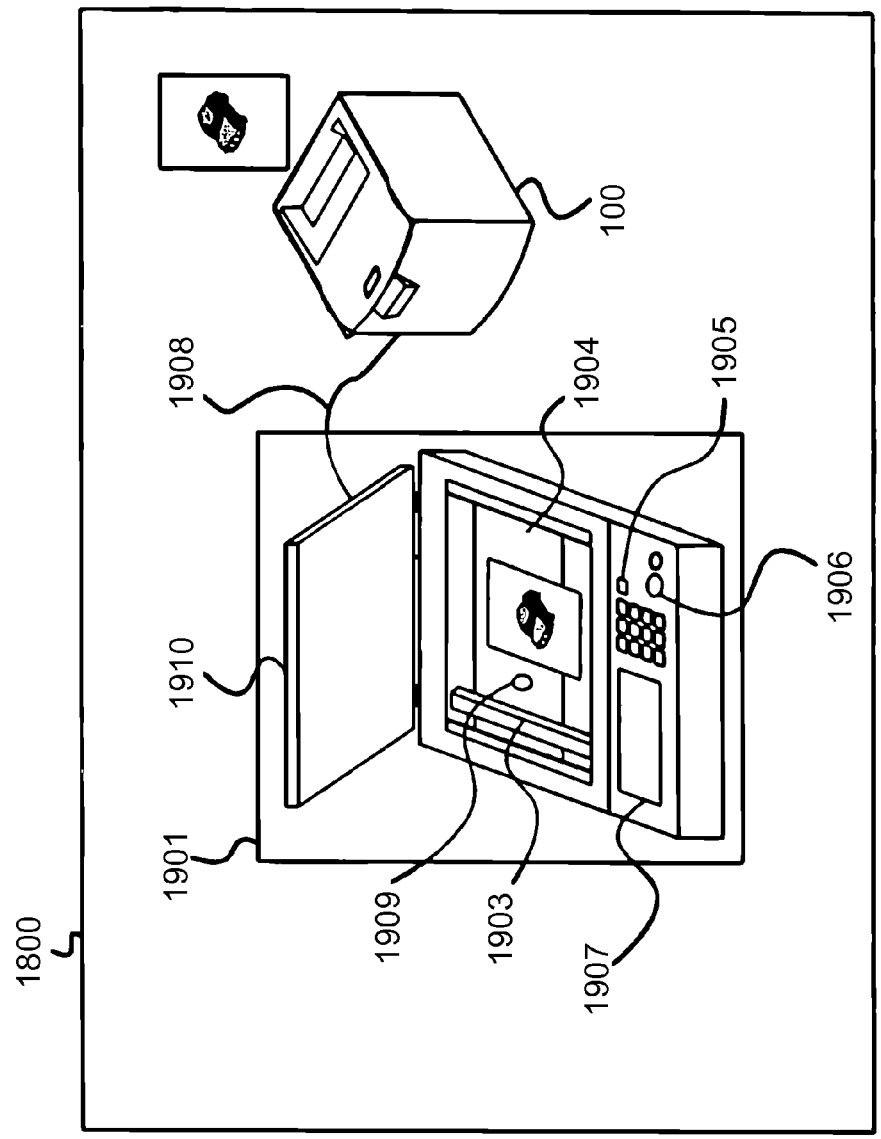
FIG. 18 is a schematic perspective view showing a multi-function product according to a third embodiment of the present invention.
Figure 19:
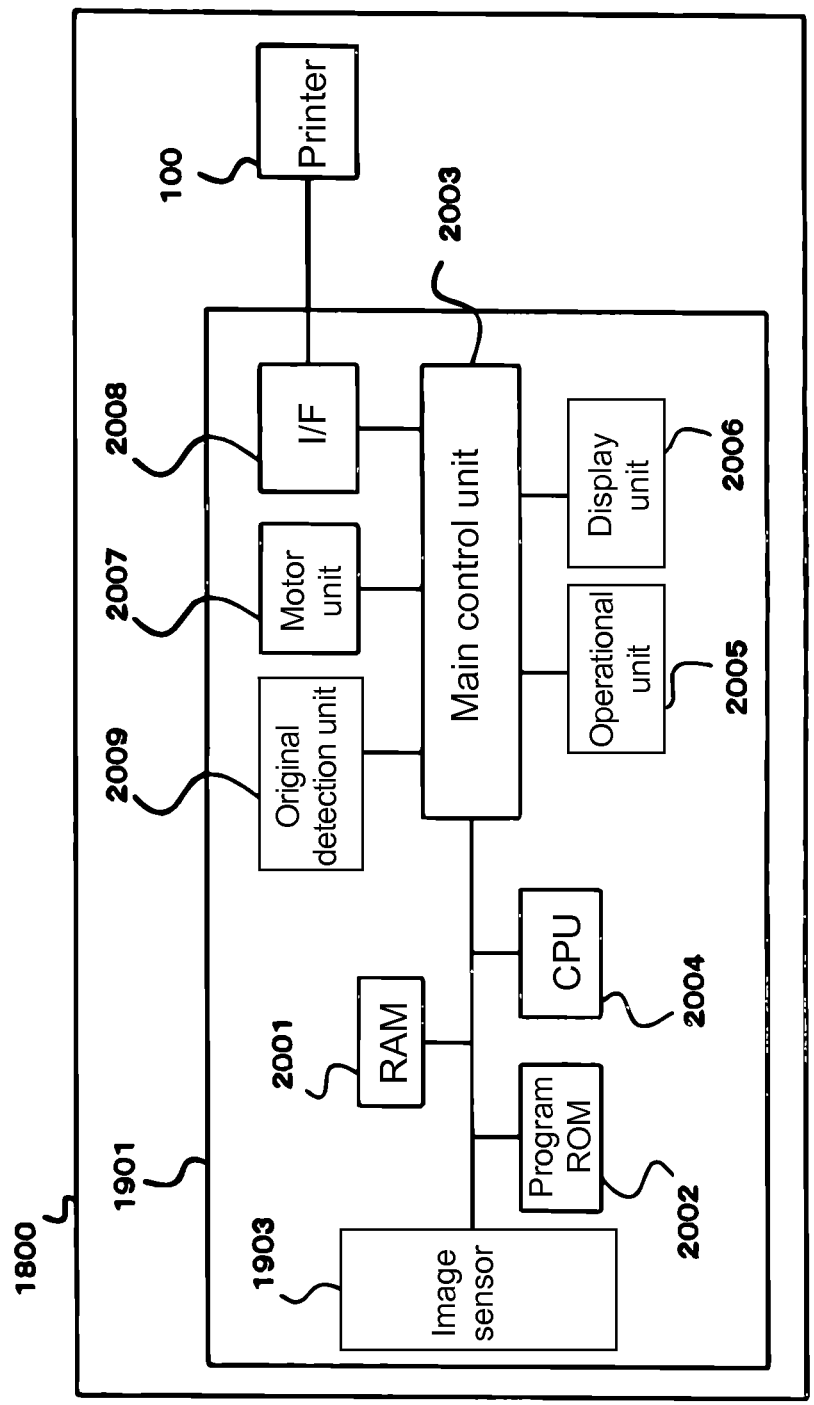
FIG. 19 is a block diagram showing a configuration of the multi-function product according to the third embodiment of the present invention.

A third embodiment of the present invention will be explained. FIG. 18 is a schematic perspective view showing a multi-function product 1800 according to the third embodiment of the present invention. FIG. 19 is a block diagram showing a configuration of the multi-function product 1800 according to the third embodiment of the present invention.

As shown in FIG. 18, a scanner 1901 reads an original, and the printer 100 prints image data thus read, thereby obtaining a copy of the original. An image sensor 1903 is disposed on a placing table 1904, so that the image sensor 1903 scans the original from above. Alternatively, the image sensor 1903 may be disposed under the placing table 1904, so that the image sensor 1903 scans the original from below.

In the embodiment, the image sensor 1903 scans the original placed on the placing table 1904 and converts an image of the original to an electrical signal. The scanner 1901 is arranged as a peripheral of the printer 100, and is connected to the printer 100 through a communication cable 1910. Alternatively, the scanner 1901 may be disposed in a housing of the printer 100.

In the embodiment, the image sensor 1903 scans the original to obtain the image data through moving a close contact type line image sensor or remotely using a CCD image sensor to read the image data. The placing table 1904 is formed of glass, and may be formed of a transparent material with sufficient strength capable of obtaining proper image quality.

As shown in FIG. 19, the multi-function product 1800 includes an RAM (Random Access Memory) 2001; a program ROM (Read only Memory) 2002; a main control unit 2003; a CPU (Central Processing Unit) 2004; an operational unit 2005; a display unit 2006; a motor unit 2007; an I/F (Interface) 2008; and an original detection unit 2009.

In the embodiment, the RAM 2001 is a volatile memory for storing the image data obtained with the image sensor 1903. The program ROM 2002 is a read-only memory for storing various control programs for image reading control of the image sensor 1903, reading/writing control relative to the RAM 2001, and the likes.

In the embodiment, the main control unit 2003 controls the CPU 2004 to execute the programs stored in the program ROM 2002 for controlling the scanner 1901 as a whole. The reading unit 2005 includes an operational button 1905 such as a ten key and a start button 1906 for starting and stopping a reading operation, and setting reading information.

In the embodiment, the display unit 2006 is formed of a display panel 1907 such as a liquid crystal panel for displaying a state and information of the scanner 1901. The motor unit 2007 is connected to the main control unit 2003 for moving the image sensor 1903 upon reading the original.

In the embodiment, the I/F unit 2008 is an interface for connecting to an external device such as the printer 100 through the communication cable 1908, so that the image data read with the I/F unit 2008 can be transferred to the external device. The I/F unit 2008 includes USB, IEEE1394, Ethernet (registered trademark), wireless LAN, and the likes. When the external device is connected through wireless LAN, the communication cable 1908 may be omitted.

In the embodiment, the original detection unit 2009 is formed of an original detection sensor 1909 for detecting the original placed on the placing table 1904, and notifies the main control unit 2003 whether the original is placed. The original detection sensor 1909 is formed of a mechanical switch to be pushed with the original when the original is placed on the original detection sensor 1909. The original detection sensor 1909 may be formed of a light reflection element for detecting light blocked with the original when the original is placed on the original detection sensor 1909. The original detection sensor 1909 may be formed of other types of sensors capable of detecting the original.

In the embodiment, a placing table cover 1910 is provided for blocking environmental light when the image sensor 1903 reads the original. The components described above are connected with each other through a bus (not shown).

Figure 20:
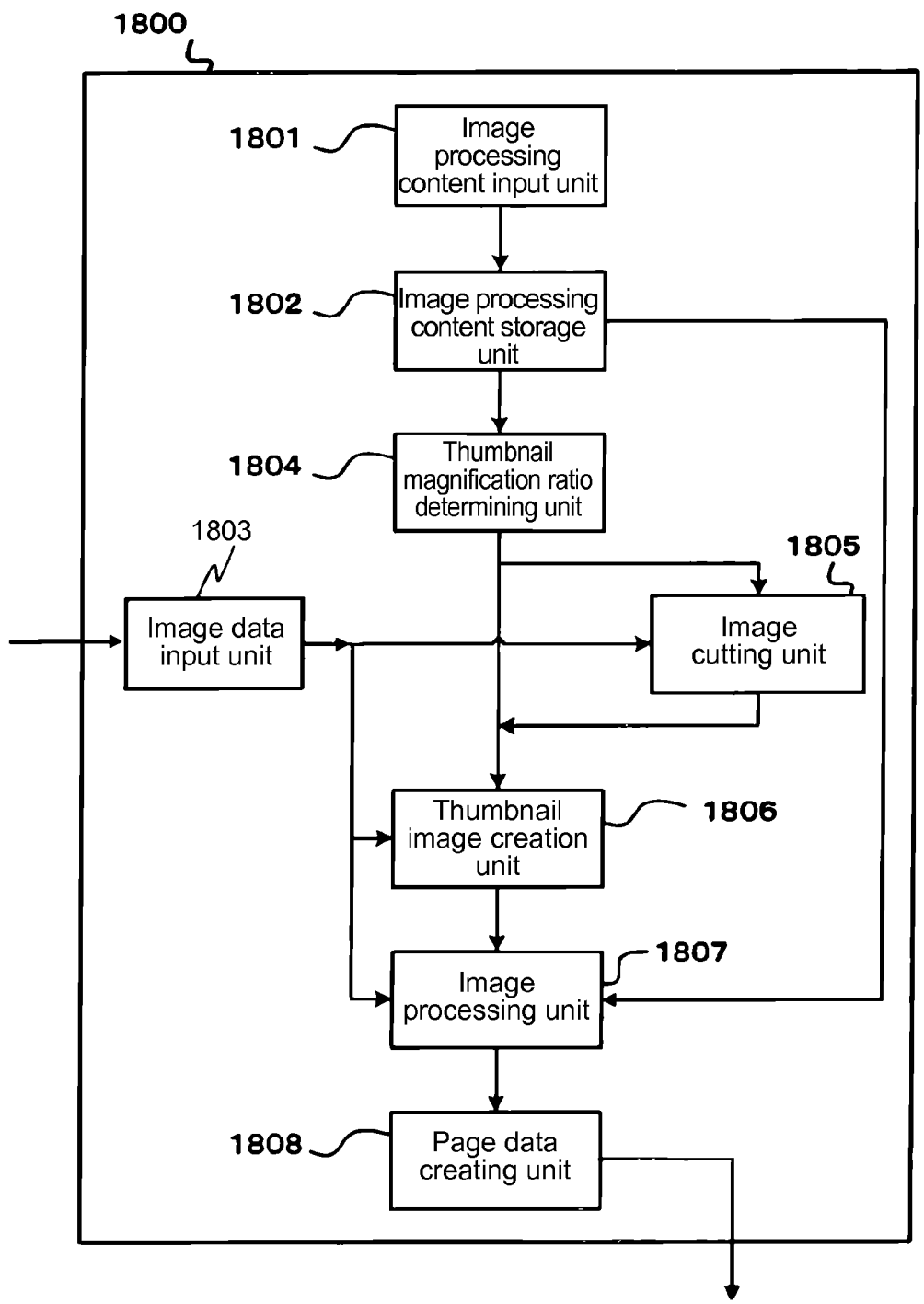
FIG. 20 is a block diagram showing a control function of the multi-function product according to the third embodiment of the present invention.

In the embodiment, the printer 100 prints the print data sent from the I/F unit 2008 of the scanner 1901. FIG. 20 is a block diagram showing a control function of the multi-function product 1800 according to the third embodiment of the present invention. The control function is stored in the program ROM 2002 as a control program, so that the CPU 2004 temporarily writes the control program into the RAM 2001 and executes the same.

As shown in FIG. 19, the multi-function product 1800 includes an image processing content input unit 1801 for inputting the image processing contents through an operation of an operation unit 2005 according to the contents displayed on a display unit 2006. The image processing content input unit 1801 sends the image processing contents thus input to an image processing content storage unit 1802.

In the embodiment, the image processing content storage unit 1802 stores the image processing contents input with the image processing content input unit 1801, and sends the image processing contents thus stored to a thumbnail magnification ratio determining unit 1804 and an image processing unit 1807.

In the embodiment, the multi-function product 1800 further includes an image data input unit 1803 for outputting the image data read and stored with the image sensor 1903 to an image cutting unit 1805 and a thumbnail image creation unit 1806. When an ordinary printing operation is performed without performing the thumbnail printing operation, the image data input unit 1803 sends the image data to the image processing unit 1807.

In the embodiment, the multi-function product 1800 further includes a thumbnail magnification ratio determining unit 1804 for determining a magnification ratio of the image data upon forming a thumbnail image according to the image processing contents stored in the image processing content storage unit 1802, and for sending the magnification ratio thus determined to the image cutting unit 1805 and the thumbnail image creation unit 1806. The image cutting unit 1805 selects and cuts a portion of the image data including a large number of images with medium tone.

In the embodiment, the thumbnail image creation unit 1806 creates the image data according to the image data input with the image data input unit 1803 and the magnification ratio determined with the thumbnail magnification ratio determining unit 1804. Further, the thumbnail image creation unit 1806 creates thumbnail image data according to the image data thus reduced and the image data cut with the image cutting unit 1805, and sends the thumbnail image data thus created to the image processing unit 1807.

In the embodiment, the image processing unit 1807 applies the image processing to the thumbnail image data created with the thumbnail image creation unit 1806 according to the image processing contents stored in the image processing content storage unit 1802, and sends the thumbnail image data thus processed to a page data creation unit 1808. When an ordinary printing operation is performed without performing the thumbnail printing operation, the image processing unit 1807 applies the image processing to the image data input with the image data input unit 1803 according to the image processing contents stored in the image processing content storage unit 1802, and sends the image data thus processed to the page data creation unit 1808.

In the embodiment, the page data creation unit 1808 creates page data per one page printable with the printer 100 from the image data processed with the image processing unit 1807 according to print setting information of the print data set in advance, and sends the page data to the I/F unit 2008. When the printer 100 receives the data per one page from the I/F unit 2008, the printer 100 prints and outputs the data per one page created with the page data creation unit 1808.

Figure 21:
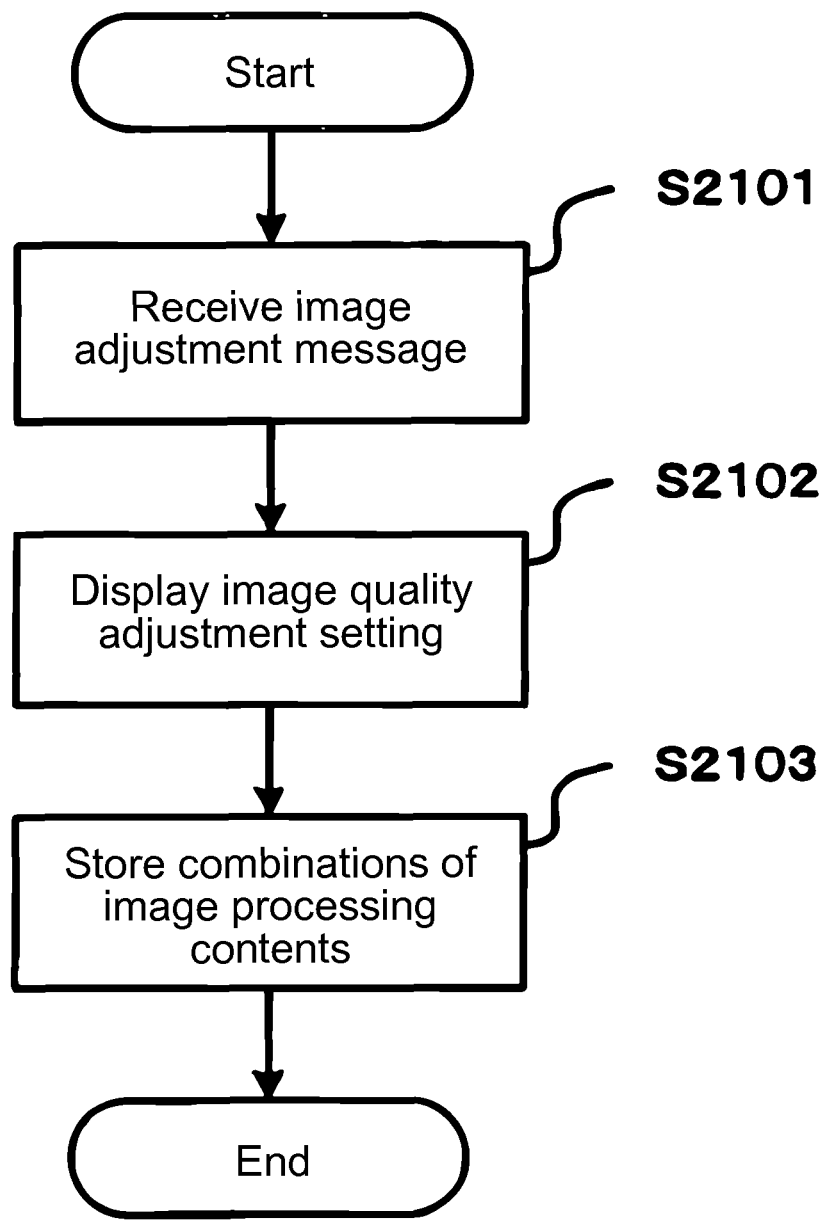
FIG. 21 is a flow chart No. 1 showing an operation of the multi-function product according to the second embodiment of the present invention.

An operation of the multi-function product 1800 as the image processing apparatus will be explained next with reference to FIGS. 21 to 27. FIG. 21 is a flow chart No. 1 showing the operation of the multi-function product 1800 according to the second embodiment of the present invention. A control program is stored in the program ROM 2002 of the scanner 1901, and the CPU 2004 temporarily stores the control program in the RAM 2001, and executes the control program.

When image quality adjustment settings are performed through the operational unit 2005, the main control unit 2003 receives an image quality adjustment message. The image quality adjustment settings may be performed through the operational unit 2005 through operating the operational button 1905 or touching the display panel 1907 formed of a pressure sensitive display panel.

In step S2101, the main control unit 2003 receives the image adjustment message. In step S2102, an image quality adjustment setting screen is displayed on the display panel 1907.

Figure 23:
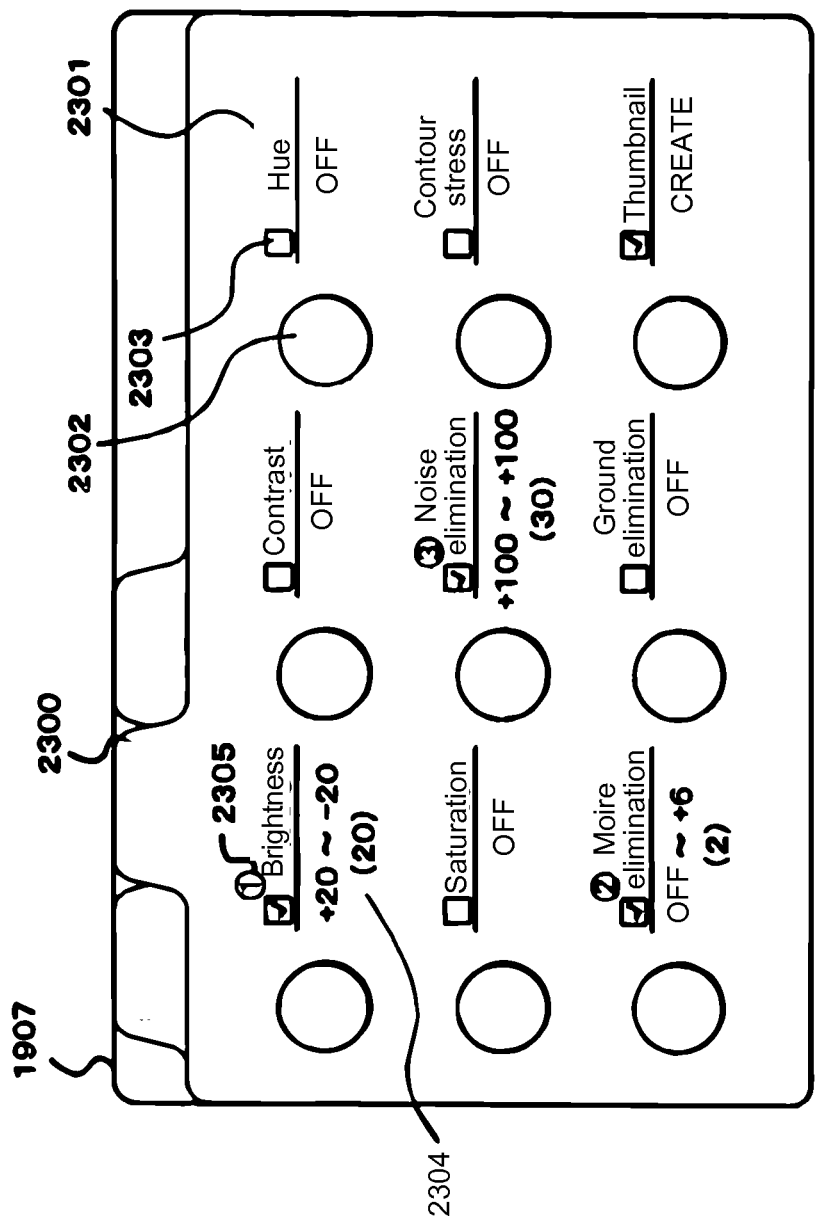
FIG. 23 is a schematic view showing an example of an image quality setting screen No. 1 of the multi-function product according to the third embodiment of the present invention.

FIG. 23 is a schematic view showing an example of the image quality setting screen No. 1 of the multi-function product 1800 according to the third embodiment of the present invention. An operation relative to parameters displayed on the display panel 1907 may be performed through touching a pressure sensitive display or pushing the operational button 1905.

In the embodiment, the display panel 1907 displays an image quality adjustment tub 2300 capable of setting image quality adjustments. The image quality adjustment tub 2300 is arranged to be capable of setting the non-spatial filtering processing parameters 501 and the spatial filtering processing parameters 502 shown in FIG. 5.

Further, the image quality adjustment tub 2300 is arranged to be capable of setting a moire elimination process as one of the spatial filtering processes for reducing an interference pattern generated by an interference between a screen of the image data obtained through reading the original and a screen created with the printer 100.

Further, the image quality adjustment tub 2300 is arranged to be capable of setting a ground elimination process as one of the non-spatial filtering processes for creating a white background of the image data obtained through reading the original.

As shown in FIG. 23, the image quality adjustment tub 2300 includes adjustment parameters 2301; check boxes 2303; setting values 2304; and combination priority orders 2305. When one of adjustment buttons 2302 is selected, an adjustment setting screen related to the corresponding adjustment parameter is displayed.

In the embodiment, the adjustment buttons 2302 are selected, and the setting values 2304 are updated according to the setting. The combination priority orders 2305 are used for setting an order in a way similar to that of the priority order 602 in the first embodiment.

Figure 24:
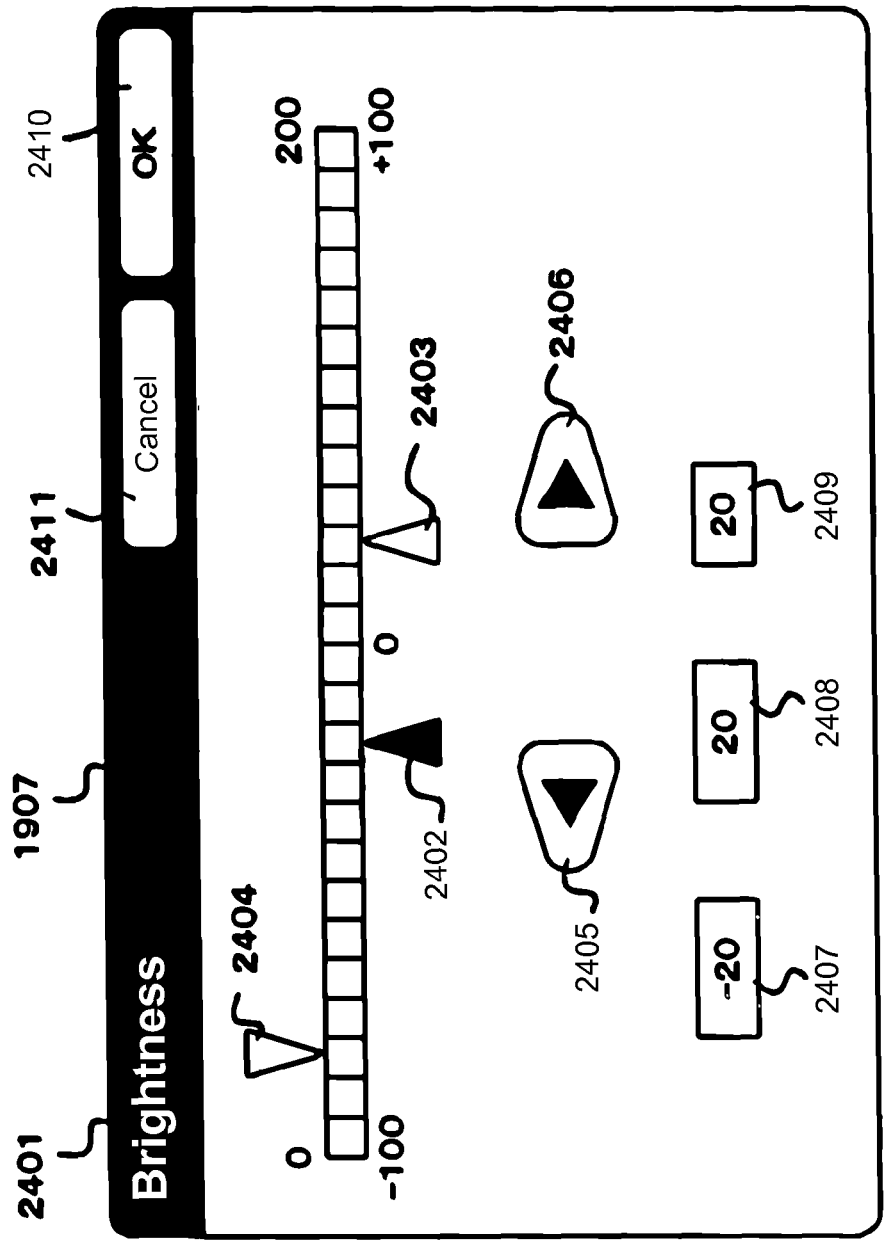
FIG. 24 is a schematic view showing an example of the image quality setting screen No. 2 of the multi-function product according to the third embodiment of the present invention.

FIG. 24 is a schematic view showing an example of the image quality setting screen No. 2 of the multi-function product 1800 according to the third embodiment of the present invention. When the adjustment button 2302 of brightness adjustment is selected, the image quality setting screen No. 2 is displayed on the display panel 1907.

As shown in FIG. 24, there are displayed on the display panel 1907 an adjustment parameter 2401; a lower limit bar 2402 for setting a lower limit; an upper limit bar 2403 for setting an upper limit; a level bar 2404 for setting a stepwise level; a left moving bar 2405 for moving the bar to a left side; a right moving bar 2406 for moving the bar to a right side; a lower limit 2407 for displaying the lower limit; an upper limit 2408 for displaying the upper limit; a stepwise level 2409 for displaying the stepwise level; an OK button 2410 for completing the setting; and a cancel button 2411 for cancelling the setting.

In the embodiment, the image quality setting screen No. 2 is displayed on the display panel 1907 for the brightness adjustment. A similar screen is displayed for other adjustment parameters for adjusting the adjustment parameters.

Figure 25:
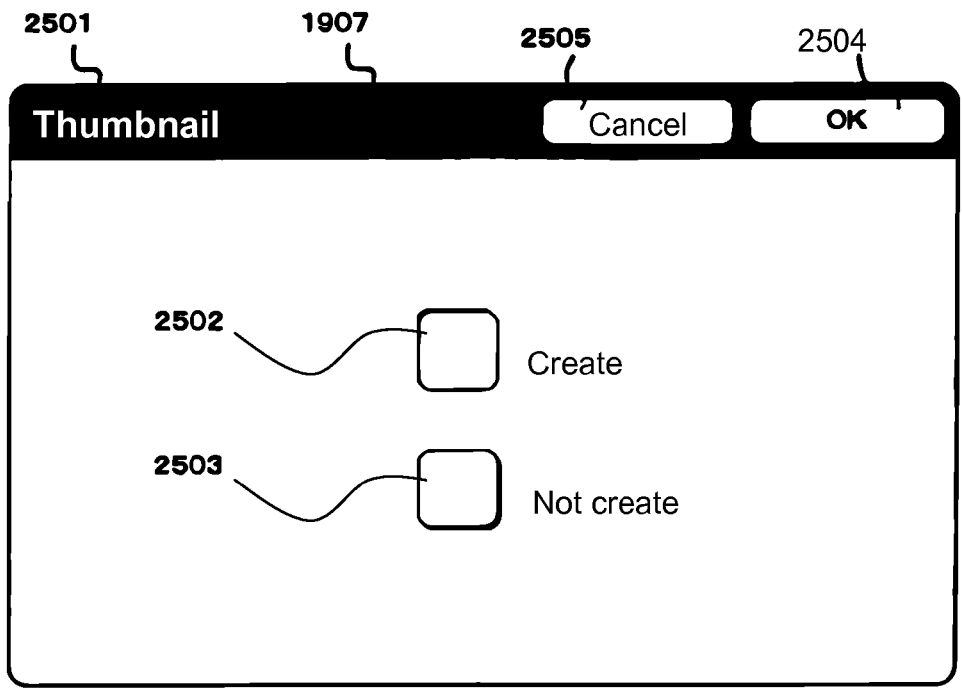
FIG. 25 is a schematic view showing an example of the image quality setting screen No. 3 of the multi-function product according to the third embodiment of the present invention.

FIG. 25 is a schematic view showing an example of the image quality setting screen No. 3 of the multi-function product 1800 according to the third embodiment of the present invention. When the thumbnail is selected in the image quality adjustment screen shown in FIG. 23, the image quality setting screen No. 3 is displayed on the display panel 1907.

As shown in FIG. 25, there are displayed on the display panel 1907 an adjustment parameter 2501; a button 2502 for selecting the thumbnail printing operation; a button 2503 for not selecting the thumbnail printing operation; an OK button 2504 for completing the setting; and a cancel button 2505 for cancelling the setting.

In step S2103, the image processing content storage unit 1802 determines a combination according to the image processing contents set in step S2102, and stores all of the combinations of the image processing contents.

Figure 22:
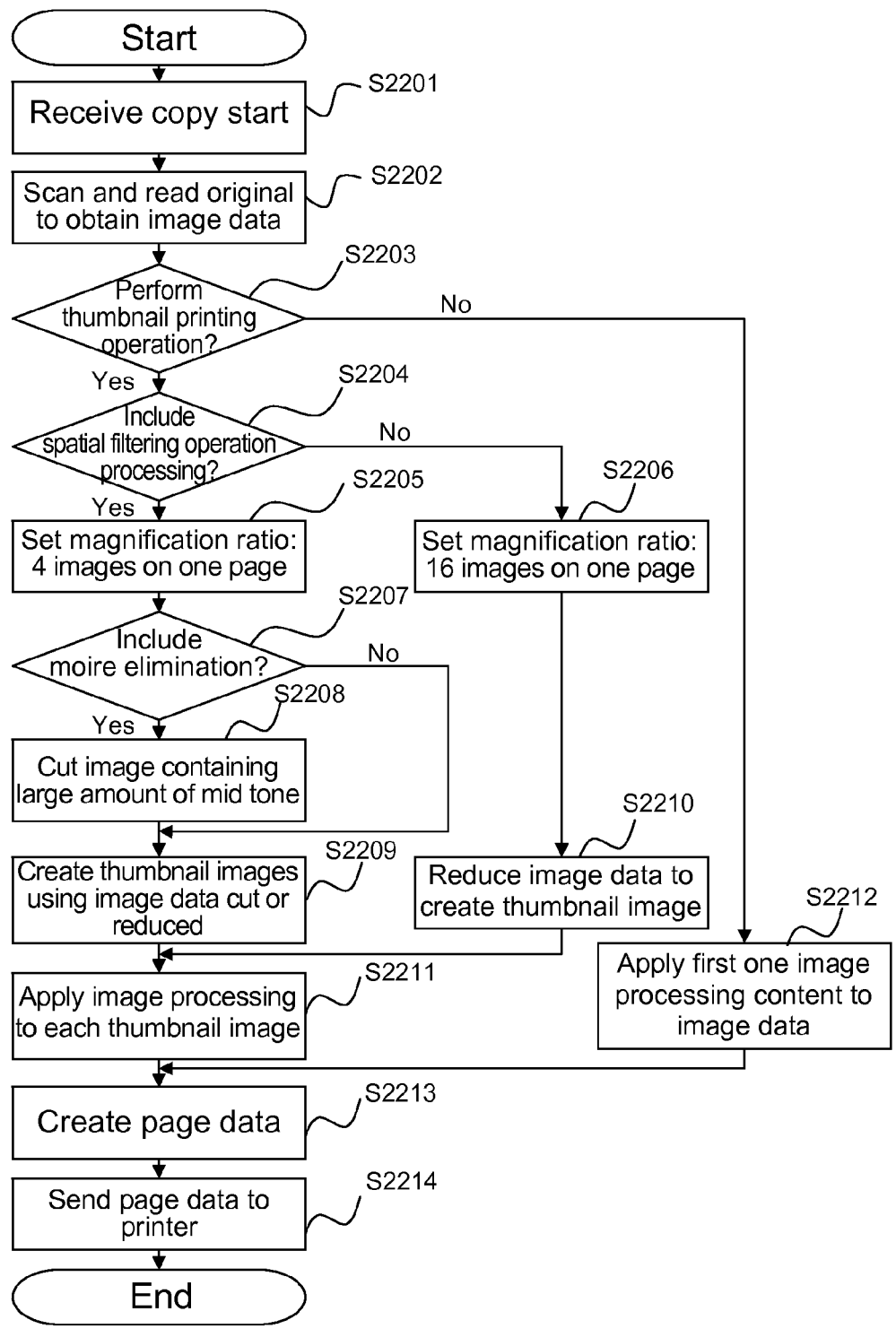
FIG. 22 is a flow chart No. 2 showing the operation of the multi-function product according to the second embodiment of the present invention.

FIG. 22 is a flow chart No. 2 showing the operation of the multi-function product 1800 according to the second embodiment of the present invention. The control program is stored in the program ROM 2002 of the scanner 1901, and the CPU 2004 temporarily stores the control program in the RAM 2001, and executes the control program.

In step S2201, the start button 1906 is pushed, and the main control unit 2003 receives copy start. In step S2202, the image data input unit 1803 controls the image sensor 1903 to scan and read the original to obtain the image data, and sends the image data to the RAM 2001.

In step S2203, it is determined whether the thumbnail printing operation is performed according to a thumbnail printing operation direction stored in the image processing content storage unit 1802. When it is determined that the thumbnail printing operation is performed, the process proceeds to step S2204. When it is determined that the thumbnail printing operation is not performed, the process proceeds to step S2212.

In step S2204, when it is determined that the thumbnail printing operation is performed in step S2203, the thumbnail magnification ratio determining unit 1804 determines whether the image processing contents stored in the image processing content storage unit 1802 include the spatial filtering processing.

In step S2205, when the image processing contents include the spatial filtering processing, the thumbnail magnification ratio determining unit 1804 sets the magnification ratio at 50%, so that four images are arranged on one page.

In step S2206, when the image processing contents do not include the spatial filtering processing, the thumbnail magnification ratio determining unit 1804 sets the magnification ratio at 25%, so that sixteen images are arranged on one page.

In step S2207, when the image processing contents include the spatial filtering processing, the thumbnail magnification ratio determining unit 1804 determines whether the image processing contents stored in the image processing content storage unit 1802 include the moire elimination. When the image processing contents include the moire elimination, the process skips step S2208, and proceeds to step S2209.

In step S2208, when the image processing contents include the moire elimination, the image cutting unit 1805 determines lateral and vertical sizes of the image data to be cut according to the magnification ratio determined with the thumbnail magnification ratio determining unit 1804 and lateral and vertical sizes of the image data input to the image data input unit 1803. Then, the image cutting unit 1805 cuts an image from the image data input to the image data input unit 1803 according to the lateral and vertical sizes thus determined.

In the embodiment, a vertical size H (pixel) and a lateral size W (pixel) of the image data to be cut are determined through the following equation.

$$H = \text{Hin} \times S/100$$

$$W = \text{Win} \times S/100$$

where, S (%) is the magnification ratio determined with the thumbnail magnification ratio determining unit 1804; Hin (pixel) is the vertical size of the image data input to the image data input unit 1803; and Win (pixel) is the lateral size of the image data input to the image data input unit 1803.

In the embodiment, the image is cut through the following method. An evaluation function f(x, y) is defined as follows, and the image is cut from a position (x, y) where the evaluation function f(x, y) becomes maximum.

$$f(x, y) = \sum_{i=0}^{w-1} \sum_{j=0}^{H-1} \text{weight}(I(x+i, y+j))$$

$$0 \le x \le W_{in} - W$$

$$0 \le y \le H_{in} - H$$

where I(x, y) is an pixel value of the image data thus input at a position (x, y), and weight (I) is a weighing function 2601 for weighing to cut an image in a region containing a large amount of mid tone susceptible to moire.

Figure 26:
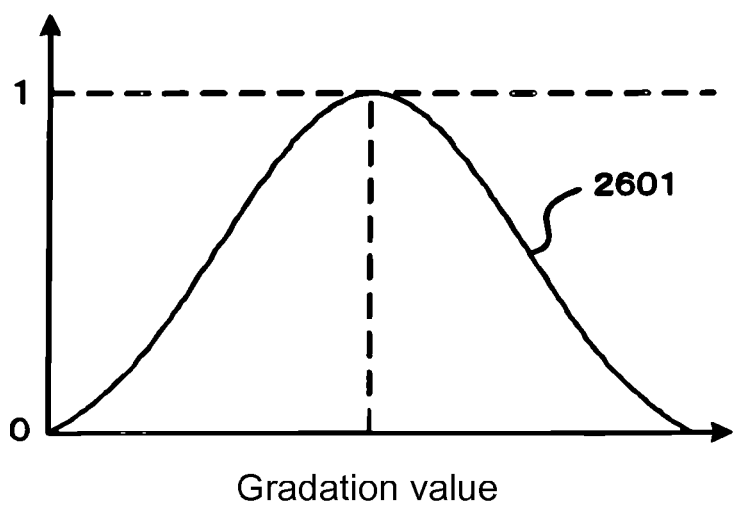
FIG. 26 is a graph showing a weighting function of the multi-function product according to the third embodiment of the present invention.

FIG. 26 is a graph showing the weighting function 2601 of the multi-function product 1800 according to the third embodiment of the present invention. In FIG. 26, the horizontal axis represents a gradation value of the image data, and the vertical axis represents a weighing value.

As shown in FIG. 26, the weighting function 2601 is defined to become maximum around the mid tone, and become minimum toward a maximum gradation value or a minimum gradation value.

When the number of the gradation level of the image data is 256, the weighting function 2601 is defined as follows, and not limited thereto.

$$\text{weight}(I) = \left[1 - \left(\frac{I - 128}{160}\right)^2\right]^2$$

In the embodiment, the thumbnail image creation unit 1806 reduces the image data input to the image data input unit 1803 according to the magnification ratio determined with the thumbnail magnification ratio determining unit 1804. An image reduction algorism includes a nearest neighbor method with a thinning process and a two-dimensional linear interpolation bilinear method.

In step S2209, the thumbnail image creation unit 1806 creates the thumbnail images relative to the image processing contents including the moire elimination using the image data cut with the image cutting unit 1805, and relative to the image processing contents not including the moire elimination using the image data thus reduced.

Figure 27:
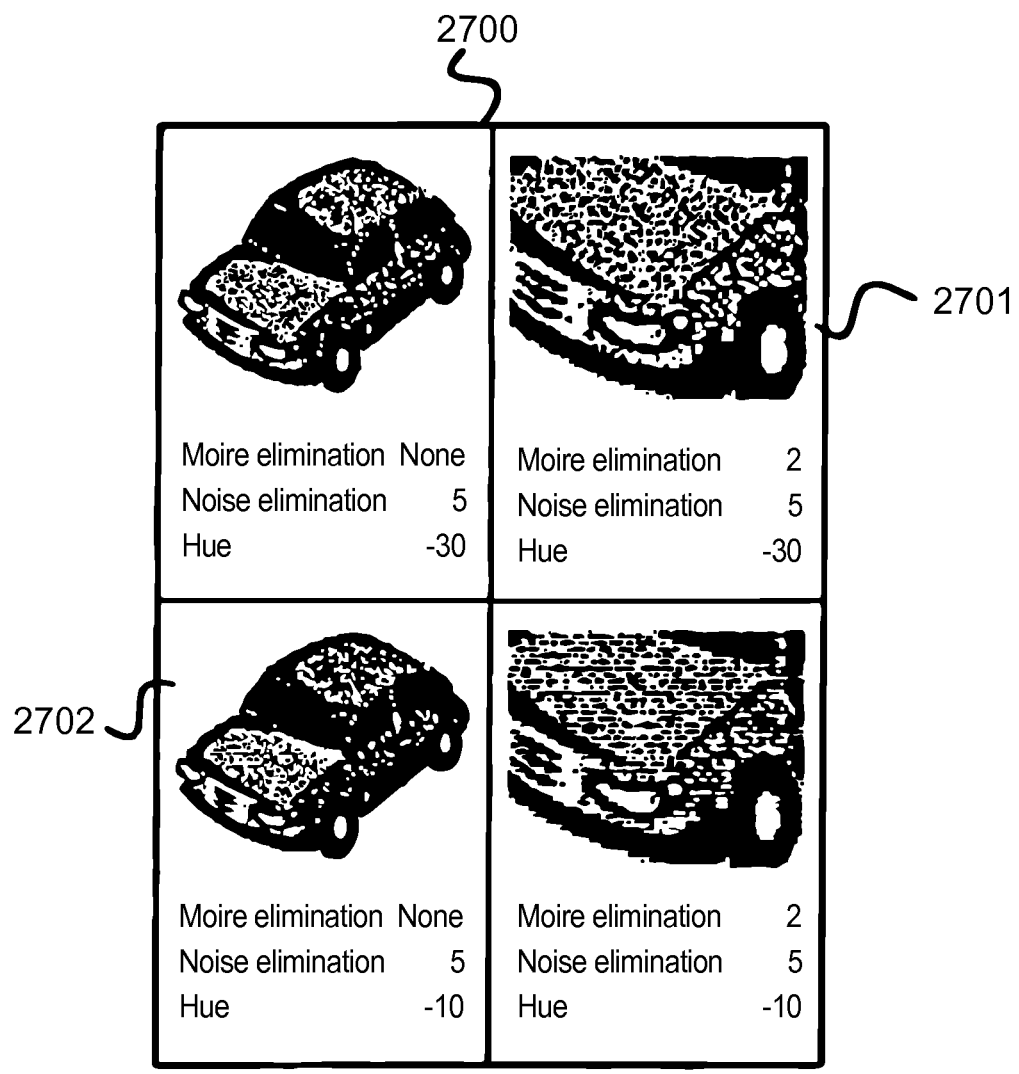
FIG. 27 is a schematic view showing an example of a print result of the multi-function product according to the third embodiment of the present invention.

FIG. 27 is a schematic view showing an example of a print result 2700, i.e., the thumbnail image, of the multi-function product 1800 according to the third embodiment of the present invention.

As shown in FIG. 27, the print result 2700 includes thumbnail images 2701 cut and processed through the image processing with the moire elimination, and thumbnail images 2701 cut, reduced, and processed through the image processing without the moire elimination.

In step S2210, when the image processing contents do not include the spatial filtering processing, the thumbnail image creation unit 1806 reduces the image data input to the image data input unit 1803 according to the magnification ratio determined with the thumbnail magnification ratio determining unit 1804 in step S2206, thereby creating the thumbnail images.

In step S2211, the image processing unit 1807 applies the image processing stored in the image processing content storage unit 1802 to each of the thumbnail images created with the thumbnail image creation unit 1806.

In step S2212, when it is determined that the thumbnail printing operation is not performed in step S2203, the image processing unit 1807 applies only a first one of the image processing contents stored in the image processing content storage unit 1802 to the image data input to the image data input unit 1803.

In step S2213, the page data creation unit 1808 creates the page data per one page according to the image data processed with the image processing unit 1807 and the print setting information set in advance.

In step S2214, the page data creation unit 1808 sends the page data thus created to the printer 100, and the printer 100 receives the page data sent from the scanner 190 and prints the page data, thereby completing the process.

As described above, in the embodiment, when the image processing contents include the moire elimination process as one of the spatial filtering processes, the thumbnail images of the image partially cut are printed along with the thumbnail images of the entire portion. Alternatively, when the image processing contents include the noise elimination process, the ground elimination process, or the contour stress process as one of the spatial filtering processes, the thumbnail images of the image partially cut may be printed along with the thumbnail images of the entire portion.

As described above, in the embodiment, the multi-function product 1800 includes the image cutting unit 1805 for cutting a portion of the image data. When the spatial filtering image processing is performed, the thumbnail image of the cut portion processed with the spatial filtering image processing is printed along with the thumbnail image without the spatial filtering image processing. Accordingly, it is possible to confirm the effect of the spatial filtering image processing in more detail.

Fourth Embodiment

A fourth embodiment of the present invention will be explained. A multi-function product 2800 in the fourth embodiment has a configuration similar to that of the multi-function product 2800 in the third embodiment, and explanations thereof are omitted.

Figure 28:
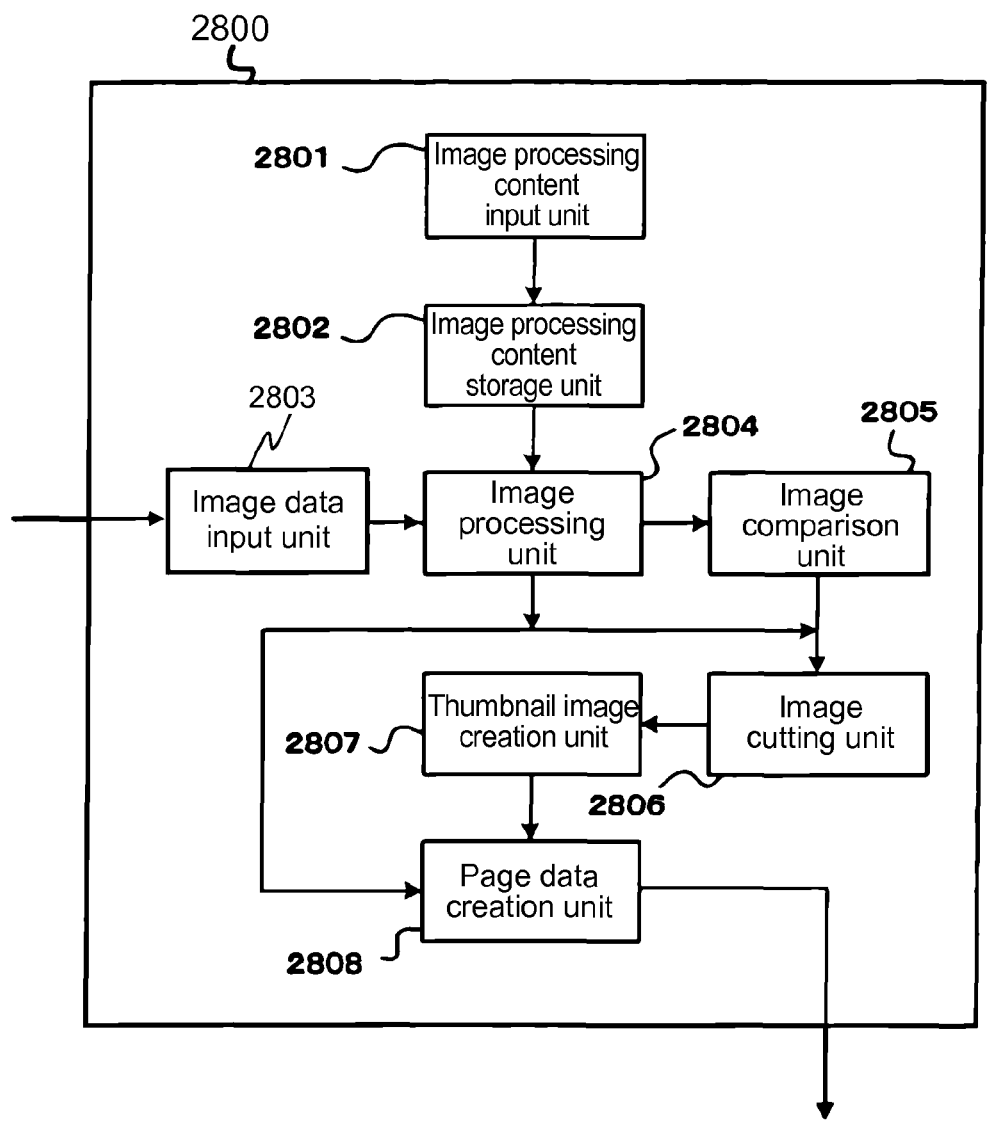
FIG. 28 is a block diagram showing a control function of a multi-function product according to a fourth embodiment of the present invention.

FIG. 28 is a block diagram showing a control function of a multi-function product 2800 according to the fourth embodiment of the present invention. The control function is stored as a control program in the program ROM 2002, and the CPU 2004 temporarily stores the control program in the RAM 2001, and executes the control program.

As shown in FIG. 28, the multi-function product 2800 includes an image processing content input unit 2801 for inputting the image processing contents through an operation of the operation unit 2005 according to the contents displayed on the display unit 2006. The image processing content input unit 2801 sends the image processing contents huts input to an image processing content storage unit 2802.

In the embodiment, the image processing content storage unit 2802 stores the image processing contents input with the image processing content input unit 2801, and sends the image processing contents thus stored to an image processing unit 2804. Further, the multi-function product 2800 includes an image data input unit 2803 for outputting the image data read and stored with the image sensor 1903 to the image processing unit 2804.

In the embodiment, the image processing unit 2804 applies the image processing to the image data input with the image data input unit 2803 according to the image processing contents stored in the image processing content storage unit 2802, and sends the image data thus processed to an image comparison unit 2805 and an image cutting unit 2806. When an ordinary printing operation is performed without performing the thumbnail printing operation, the image processing unit 2804 sends the image data thus processed to a page data creation unit 2808.

In the embodiment, the image comparison unit 2805 compares a plurality of the image data processed with the image processing unit 2804 to determine a region where a mutual difference becomes largest. Then, the image comparison unit 2805 outputs the region to the image cutting unit 2806.

In the embodiment, the image cutting unit 2806 cuts out data from the image data processed with the image processing unit 2804 according to the region compared and determined with the image comparison unit 2805. Then, the image cutting unit 2806 sends the image data thus cut out to a thumbnail image creation unit 2807.

In the embodiment, the thumbnail image creation unit 2807 creates the thumbnail image data according to the image data cut out with the image cutting unit 2806. Further, the thumbnail image creation unit 2807 sends the thumbnail image data thus created to the page data creation unit 2808.

In the embodiment, the page data creation unit 2808 creates page data per one page printable with the printer 100 from the image data processed with the thumbnail image creation unit 2807 according to print setting information of the print data set in advance, and sends the page data thus created to the I/F unit 2008. Then, the I/F unit 2008 sends the data per one page created with the page data creation unit 2808 to the printer 100.

An operation of the multi-function product 2800 as the image processing apparatus will be explained next with reference to FIGS. 29 to 30.

Figure 29:
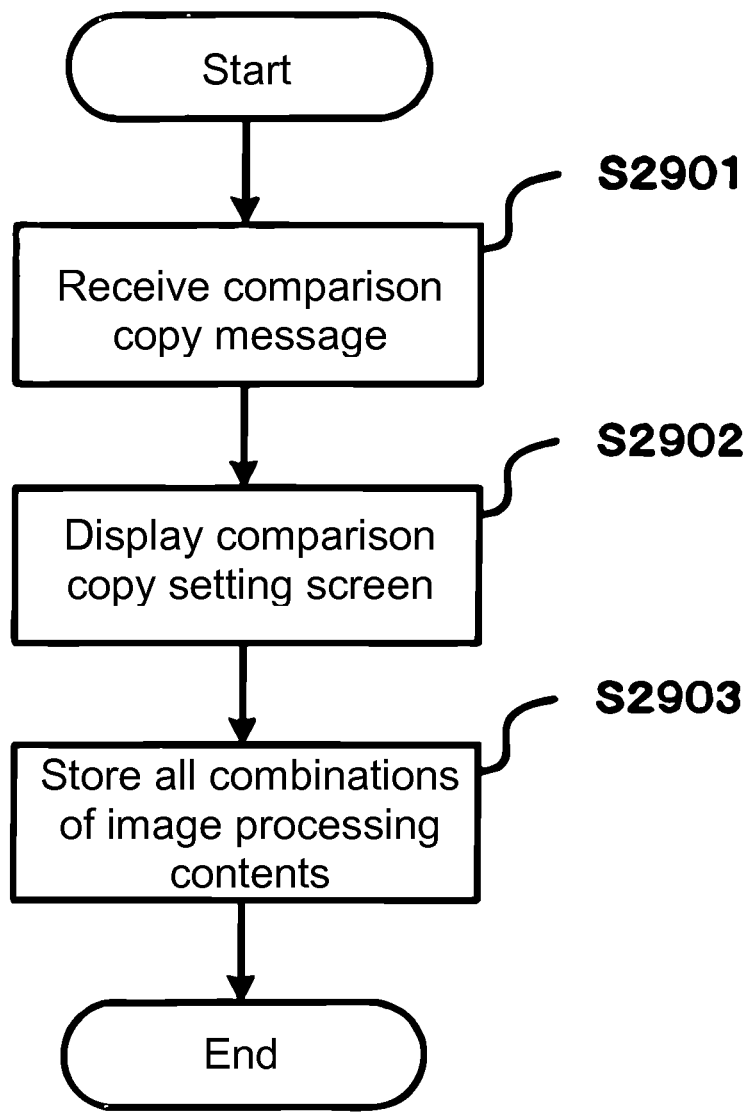
FIG. 29 is a flow chart No. 1 showing an operation of the multi-function product according to the fourth embodiment of the present invention.

FIG. 29 is a flow chart No. 1 showing the operation of the multi-function product 2800 according to the fourth embodiment of the present invention. In the operation, the thumbnail printing operation is set before the image processing of the scanner 190 shown in FIG. 30. The control program is stored in the program ROM 2002 of the scanner 1901, and the CPU 2004 temporarily stores the control program in the RAM 2001, and executes the control program.

In step S2901, when a comparison copy setting is performed through the operational unit 2005, the main control unit 2003 receives a comparison copy message. An operation of the comparison copy setting on the operational unit 2005 may be performed through pushing the operational button 1905 or touching the display panel 1907 formed of the pressure sensitive display.

Figure 31:
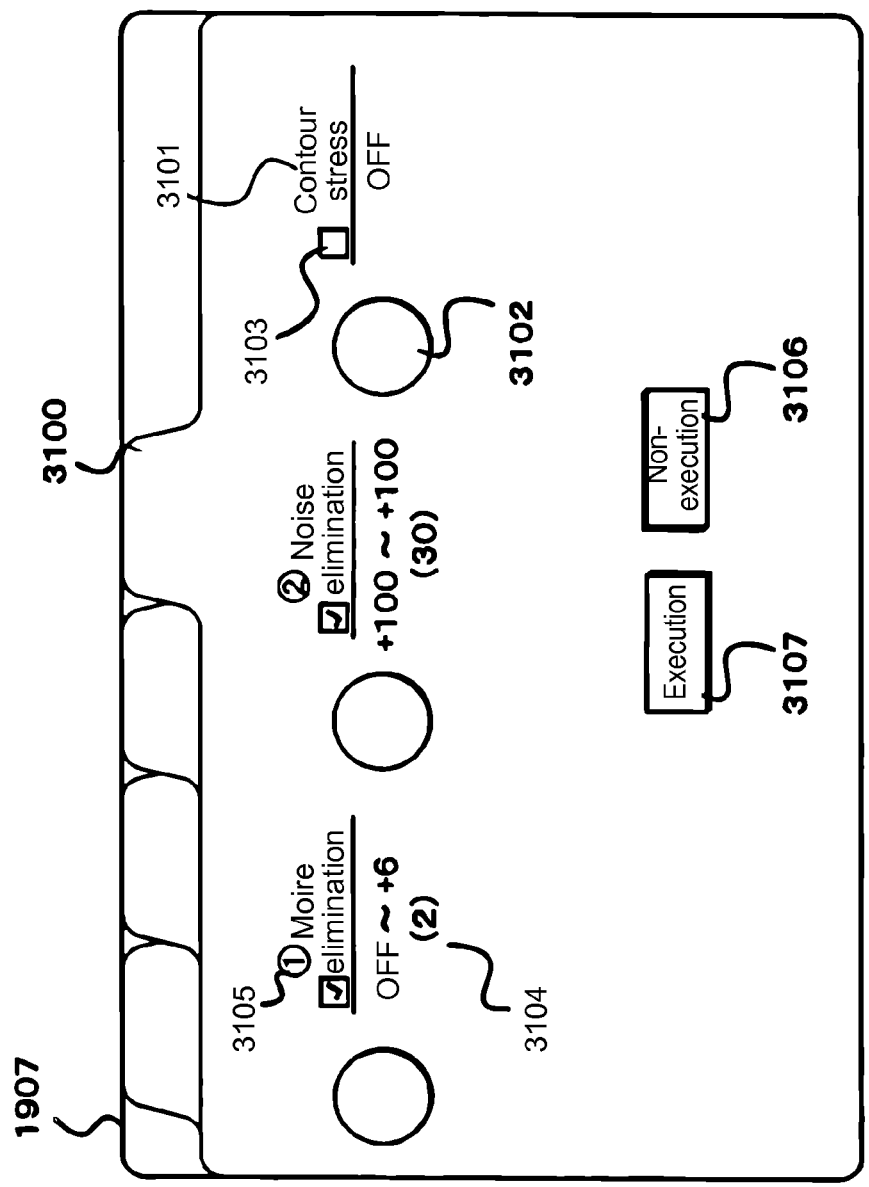
FIG. 31 is a schematic view showing an example of a setting screen of the multi-function product according to the fourth embodiment of the present invention.

In step S2902, when the main control unit 2003 receives the comparison copy message, a comparison copy setting screen is displayed on the display panel 1907. FIG. 31 is a schematic view showing an example of the comparison copy setting screen of the multi-function product 2800 according to the fourth embodiment of the present invention. An operation relative to parameters displayed on the display panel 1907 may be performed through touching a pressure sensitive display or pushing the operational button 1905.

In the embodiment, the display panel 1907 displays a comparison copy tub 3100 capable of setting the image processing contents. On the comparison copy tub 3100, it is possible to set only the image processing contents related to the spatial filtering processing parameters described in the third embodiment.

In the embodiment, the comparison copy tub 3100 includes adjustment parameters 3101; adjustment buttons 3102; check boxes 3103; setting levels 3104; and combination priority orders 3105. When one of the adjustment buttons 3102 is selected, an adjustment setting screen related to the corresponding adjustment parameter is displayed for setting.

In the embodiment, after the setting described above, the check boxes 3103 are checked, and the setting values 2304 are updated according to the setting. The combination priority orders 3105 are used for setting an order in a way similar to that of the priority order 602 in the first embodiment. When one of the adjustment buttons 3102 is selected, the adjustment setting screen shown in FIG. 24 is displayed. When the comparison copy is performed, an execution button 3107 is selected. When the comparison copy is not performed, a non-execution button 3106 is selected.

In step S2903, the image processing content storage unit 2802 determines a combination according to the image processing contents set in step S2902, and stores all of the combinations of the image processing contents.

Figure 30:
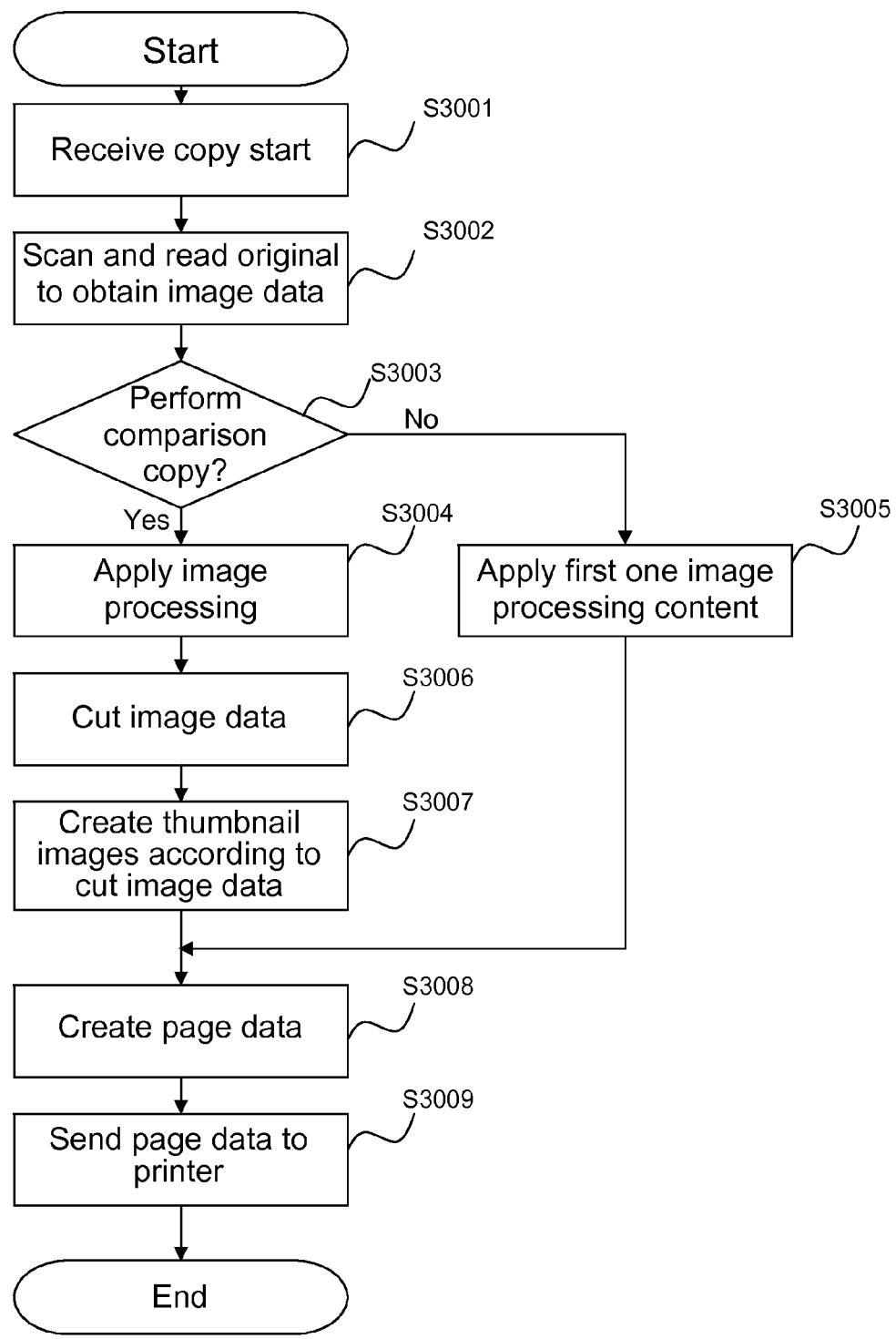
FIG. 30 is a flow chart No. 2 showing the operation of the multi-function product according to the fourth embodiment of the present invention.

FIG. 30 is a flow chart No. 2 showing the operation of the multi-function product according to the fourth embodiment of the present invention. The control program is stored in the program ROM 2002 of the scanner 1901, and the CPU 2004 temporarily stores the control program in the RAM 2001, and executes the control program.

In step S3001, the start button 1906 is pushed, and the main control unit 2003 receives copy start. In step S3002, the image data input unit 2803 controls the image sensor 1903 to scan and read the original to obtain the image data, and stores the image data in the RAM 2001.

In step S3003, it is determined whether the comparison copy is performed. When it is determined that the comparison copy is performed, the process proceeds to step S3004. When it is determined that the comparison copy is not performed, the process proceeds to step S3005.

In step S3004, when it is determined that the comparison copy is performed, the image processing unit 2804 applies the image processing to the image data input with the image data input unit 2803 according to the image processing contents stored in the image processing content storage unit 2802, thereby creating the image data thus processed.

In step S3005, when it is determined that the comparison copy is not performed, the image processing unit 2804 applies only a first one of the image processing contents stored in the image processing content storage unit 2802 to the image data input to the image data input unit 2803.

In the embodiment, when the comparison copy is performed, the image comparison unit 2805 determines lateral and vertical sizes of the image data to be cut according to the magnification ratio determined in advance and lateral and vertical sizes of the image data input to the image data input unit 2803. Then, the image comparison unit 2805 compares the image data input to the image data input unit 2803 with the image data processed with the image processing unit 2804 to determine the region with a largest difference.

In the embodiment, the vertical size H (pixel) and the lateral size W (pixel) of the image data to be cut are determined through the following equation.

$H = H_{in} \times S/100$ $W = W_{in} \times S/100$ where, S (%) is the magnification ratio; Hin (pixel) is the vertical size of the image data input to the image data input unit 2803; and Win (pixel) is the lateral size of the image data input to the image data input unit 2803.

In the embodiment, the images are compared through the following method. An evaluation function f(x, y) for the image comparison at a position (x, y) is defined as follows, and the image is cut from a position (x, y) where the evaluation function f(x, y) becomes maximum.

$$f(x, y) = \sum_{k=1}^{N} \sum_{i=0}^{w-1} \sum_{j=0}^{H-1} \{I(x+i, y+j) - I'_k(x+i, y+j)\}^2$$

$$0 \le x \le W_{in} - W$$

$$0 \le y \le H_{in} - H$$

where I(x, y) is an pixel value of the image data thus input at a position (x, y); I' (x, y) is an pixel value of the image data at the position (x, y) thus processed according to a k-th one of the image processing contents; and N is a total number of the image processing contents.

In the embodiment, f(x, y) is a sum of square differences between the image data before processed and the image data after processed, and is an example of evaluation functions for determining the region with a largest difference. The evaluation function is not limited thereto, and may be other function for determining a difference between image data or matching thereof. A function for determining matching includes a well-known normalization correlation method as a template matching method.

In step S3006, the image cutting unit 2806 cuts image data from the image data thus processed according to the position (x, y) determined with the image comparison unit 2805 and the lateral and vertical sizes H and W.

In step S3007, the thumbnail image creation unit 2807 creates the thumbnail images according to the image data cut with the image cutting unit 2806.

In step S3008, the page data creation unit 2808 creates the page data per one page according to the thumbnail image data created in step S3007 or the image data processed in step S3005, and the print setting information set in advance.

In step S3009, the page data creation unit 2808 sends the page data thus created to the printer 100, and the printer 100 receives the page data sent from the scanner 190 and prints the page data.

As described above, the multi-function product 2800 includes the image comparison unit 2805 for comparing the image data before and after processed with the spatial filtering image processing, and the image cutting unit 2806 for cutting out the region where the difference becomes largest. Then, the thumbnail images before and after the image processing are printed. Accordingly, it is possible to confirm the effect of the spatial filtering image processing in more detail.

In the embodiments described above, the printer is used for printing. When a display device such as a monitor is provided for outputting the thumbnail images, the present invention is applicable to an information processing terminal such as a personal computer or an information device such as a digital camera and a mobile phone.

In the embodiments described above, when it is determined that the image processing contents include the spatial filtering processing, the thumbnail magnification ratio determining unit 1804 sets the magnification ratio at 50%, so that four images are arranged on one page. When it is determined that the image processing contents do not include the spatial filtering processing, the thumbnail magnification ratio determining unit 1804 sets the magnification ratio at 25%, so that sixteen images are arranged on one page. Alternatively, the thumbnail magnification ratio determining unit 1804 may set the magnification ratio so that eight or thirty-two images are arranged on one page, or may set the magnification ratio to other ratios.

In the embodiments described above, when the spatial filtering image processing depending on the spatial characteristic affecting the thumbnail image is performed, the magnification ratio is changed. When the image data are not reduced to an extent that the spatial filtering image processing does not affect the spatial characteristic, it is possible to change the magnification ratio according to the image processing not depending on the spatial characteristic of the image data.

The present invention may be widely applicable to the image processing apparatus for processing the image data such as the spatial filtering image processing and outputting the image data.

The disclosure of Japanese Patent Application No. 2007-324914, filed on Dec. 17, 2007, is incorporated in the application by the reference.

While the invention has been explained with reference to the specific embodiments of the invention, the explanation is illustrative and the invention is limited only by the appended claims.

What is claimed is:

1. An image processing apparatus for processing and outputting image data, comprising:
   an image processing content storage unit for storing image processing contents so that an image processing is divided into a non-spatial filtering processing not depending on a spatial characteristic of the image data and a spatial filtering processing depending on the spatial characteristic of the image data, said non-spatial filtering processing including at least one of a brightness adjustment processing, a contrast adjustment processing, a hue adjustment processing, a color saturation processing, and a ground elimination processing, said spatial filtering processing including at least one of a noise elimination processing, a contour stress processing for stressing a contour of the image data, and a moiré elimination processing;
   an image processing content sorting unit for sorting the image processing contents;
   a thumbnail magnification ratio determining unit for determining a magnification ratio of a thumbnail image according to the image processing contents, said thumbnail magnification ratio determining unit being arranged to determine the magnification ratio at a first ratio when the image processing contents contain only the non-spatial filtering processing, and at a second ratio when the image processing contents contain only the spatial filtering processing, said second ratio being greater than the first ratio;
   a thumbnail image creation unit for creating the thumbnail image from the image data according to the magnification ratio; and
   an image processing unit for applying the image processing to the thumbnail image according to the image processing contents.

2. The image processing apparatus according to claim 1, further comprising an image cutting unit for cutting out a portion of the image data, said thumbnail image creation unit creating the thumbnail image in the portion when the image processing unit applies the spatial filtering processing.

3. The image processing apparatus according to claim 2, wherein said image cutting unit is adapted to cut out a region containing a large number of pixels with medium tone from the image data.

4. The image processing apparatus according to claim 2, further comprising an image comparison unit for comparing the image data before the image processing unit applies the image processing and the image data after the image processing unit applies the image processing to obtain a difference, said image cutting unit cutting out the region where the difference is greater than a specific value.

5. An image processing apparatus for processing and outputting image data, comprising:
   an image processing content storage unit for storing image processing contents of a non-spatial filtering processing not depending on a spatial characteristic of the image data and a spatial filtering processing depending on the spatial characteristic of the image data, said non-spatial filtering processing including at least one of a brightness adjustment processing, a contrast adjustment processing, a hue adjustment processing, a color saturation processing, and a ground elimination processing, said spatial filtering processing including at least one of a noise elimination processing, a contour stress processing for stressing a contour of the image data, and a moiré elimination processing;
   an image processing content sorting unit for sorting the image processing contents;
   a magnification ratio adjusting unit for adjusting a magnification ratio of an image according to the image processing contents, said magnification ratio adjusting unit being arranged to adjust the magnification ratio at a first ratio when the image processing contents contain only the non-spatial filtering processing and at a second ratio when the image processing contents contain only the spatial filtering processing, said second ratio being greater than the first ratio;
   an image creation unit for creating a reduced image according to the magnification ratio; and
   an image processing unit for applying at least one of the non-spatial filtering processing and the spatial filtering processing to the reduced image according to the image processing contents.

* * * * *